(12) United States Patent
Cohen et al.

(10) Patent No.: US 9,129,192 B2
(45) Date of Patent: Sep. 8, 2015

(54) SEMANTIC OBJECT PROPOSAL GENERATION AND VALIDATION

(71) Applicant: Adobe Systems Incorporated, San Jose, CA (US)

(72) Inventors: Scott Cohen, Sunnyvale, CA (US); Brian Lynn Price, San Jose, CA (US); Ejaz Ahmed, Hyattsville, MD (US)

(73) Assignee: Adobe Systems Incorporated, San Jose, CA (US)

( * ) Notice: Subject to any disclaimer, the term of this patent is extended or adjusted under 35 U.S.C. 154(b) by 57 days.

(21) Appl. No.: 14/107,601

(22) Filed: Dec. 16, 2013

(65) Prior Publication Data
US 2015/0170006 A1 Jun. 18, 2015

(51) Int. Cl.
| | | |
|---|---|---|
| G06K 9/34 | (2006.01) | |
| G06K 9/72 | (2006.01) | |
| G06K 9/46 | (2006.01) | |
| G06F 17/30 | (2006.01) | |
| G06T 7/00 | (2006.01) | |

(52) U.S. Cl.
CPC .......... *G06K 9/726* (2013.01); *G06F 17/30247* (2013.01); *G06F 17/30277* (2013.01); *G06F 17/30825* (2013.01); *G06K 9/4671* (2013.01); *G06T 7/0081* (2013.01); *G06T 7/0087* (2013.01); *G06T 2200/24* (2013.01); *G06T 2207/20076* (2013.01); *G06T 2207/20092* (2013.01); *G06T 2207/20144* (2013.01)

(58) Field of Classification Search
USPC ................................................ 382/173, 180
See application file for complete search history.

(56) References Cited

U.S. PATENT DOCUMENTS

| | | | |
|---|---|---|---|
| 6,400,831 B2 * | 6/2002 | Lee et al. ....................... | 382/103 |
| 7,627,703 B2 * | 12/2009 | Oliver .............................. | 710/72 |
| 8,027,549 B2 * | 9/2011 | Podilchuk ...................... | 382/305 |
| 8,452,794 B2 | 5/2013 | Yang et al. | |
| 2007/0288453 A1 | 12/2007 | Podilchuk | |
| 2008/0037904 A1 * | 2/2008 | Hiramoto et al. .............. | 382/306 |
| 2008/0235574 A1 * | 9/2008 | Telek et al. .................... | 715/240 |
| 2013/0060765 A1 | 3/2013 | Lin et al. | |

OTHER PUBLICATIONS

U.S. Appl. No. 14/107,520, Notice of Allowability, mailed May 19, 2015 (9 pages).

(Continued)

*Primary Examiner* — Kanjibhai Patel
(74) *Attorney, Agent, or Firm* — Finch & Maloney PLLC

(57) ABSTRACT

Techniques are disclosed herein that enable digital images to be segmented based on a user's semantic input. In other words, given an input image of a person walking a dog adjacent to a tree, a user can simply provide the semantic input "dog" and the system will segment the dog from the other elements in the image. If the user provides other semantic input, such as "person" or "tree", the system will segment the person or the tree, respectively, from the same image. Using semantic input advantageously eliminates any need for a user to directly interact with the input image through a tedious process of painting brush strokes, tracing boundaries, clicking target points, and/or drawing bounding boxes. Thus semantic input represents an easier and more intuitive way for users to interact with an image segmentation interface, thereby enabling novice users to take advantage of advanced image segmentation techniques.

19 Claims, 10 Drawing Sheets
(6 of 10 Drawing Sheet(s) Filed in Color)

(56) References Cited

OTHER PUBLICATIONS

Batra et al., "iCoseg: Interactive Cosegmentation with Intelligent Scribble Guidance", Proceedings of IEEE Computer Vision and Pattern Recognition (CVPR 2010), pp. 3169-3176 (2010).
Boykov et al., "Interactive Graph Cuts for Optimal Boundary & Region Segmentation of Objects in N-D Images", Proceedings of the 2001 International Conference on Computer Vision (ICCV '01), vol. I, pp. 105-112 (2001).
Cheng et al., "Global Contrast based Salient Region Detection", Proceedings of IEEE Computer Vision and Pattern Recognition (CVPR 2011), pp. 409-416 (2011).
Chuang et al., "A Bayesian Approach to Digital Matting", Proceedings of IEEE Computer Vision and Pattern Recognition (CVPR 2001), pp. 264-271 (2001).
Felzenszwalb et al., "Object Detection with Discriminatively Trained Part Based Models", IEEE Transactions on Pattern Analysis and Machine Intelligence, vol. 32, iss. 9, pp. 1627-1645 (2010).
Harel et al., "Graph-Based Visual Saliency", Advances in Neural Information Processing Systems 19, pp. 545-552 (2007).
Joulin et al., "Discriminative Clustering for Image Co-Segmentation", Proceedings of IEEE Computer Vision and Pattern Recognition (CVPR 2010), pp. 1943-1950 (2010).
Joulin et al., "Multi-Class Cosegmentation", Proceedings of IEEE Computer Vision and Pattern Recognition (CVPR 2012), pp. 542-549 (2012).
Kim et al., "Distributed Cosegmentation via Submodular Optimization on Anisotropic Diffusion", Proceedings of the 2011 International Conference on Computer Vision (ICCV '11), pp. 169-176 (2011).
Kuettel et al., "Figure-Ground Segmentation by Transferring Window Masks", Proceedings of IEEE Computer Vision and Pattern Recognition (CVPR 2012), pp. 558-565 (2012).
Kuettel et al., "Segmentation Propagation in ImageNet", Proceedings of the 12th European Conference on Computer Vision: Part VII (EECV '12), pp. 459-473 (2012).
Laput et al., "PixelTone: A Multimodal Interface for Image Editing", Proceedings of the SIGCHI Conference on Human Factors in Computing Systems (CHI '13), pp. 2185-2194 (2013).
Levin et al., "A Closed Form Solution to Natural Image Matting", IEEE Transactions on Pattern Analysis and Machine Intelligence, vol. 30, iss. 2, pp. 228-242 (2008).
Liu et al., "Nonparametric Scene Parsing via Label Transfer", IEEE Transactions on Pattern Analysis and Machine Intelligence, vol. 33, iss. 12, pp. 2368-2382 (2011).
Liu et al., "SIFT Flow: Dense Correspondence Across Different Scenes", Proceedings of the 10th European Conference on Computer Vision: Part III (EECV '08), pp. 28-42 (2008).
Malisiewicz et al., "Ensemble of Exemplar-SVMs for Object Detection and Beyond", Proceedings of the 2011 International Conference on Computer Vision (ICCV '11), pp. 89-96 '(2011).
Mortensen et al., "Intelligent Scissors for Image Composition", Proceedings of the 22nd Annual Conference on Computer Graphics and Interactive Techniques (SIGGRAPH '95), pp. 191-198 (1995).
Mukherjee et al., "Scale Invariant Cosegmentaion for Image Groups", Proceedings of IEEE Computer Vision and Pattern Recognition (CVPR 2011), pp. 1881-1888 (2011).
Rother et al., "GrabCut: Interactive Foreground Extraction using Iterated Graph Cuts", ACM Trans. Graph., vol. 23, iss. 3, pp. 309-314 (2004).
Rubinstein et al., "Unsupervised Joint Object Discovery and Segmentation in Internet Images", Proceedings of IEEE Computer Vision and Pattern Recognition (CVPR 2013), pp. 1939-1946 (2013).
Shen et al., "Mobile Product Image Search by Automatic Query Object Extraction", EECV 2012, Part IV, LNCS 7575, pp. 114-127 (2012).
Shen et al., "Object Retrieval and Localization with Spatially-Constrained Similarity Measure and k-NN Re-Ranking", Proceedings of IEEE Computer Vision and Pattern Recognition (CVPR 2012), pp. 3013-3020 (2012).
Shotton et al., "TextonBoost: Joint Appearance, Shape and Context Modeling for Multi-class Object Recognition and Segmentation", Proceedings of the 9th European Conference on Computer Vision: Part I (EECV '06), pp. 1-15 (2006).
Tighe et al., "Superparsing: Scalable Nonparametric Image Parsing with Superpixels", Proceedings of the 11th European Conference on Computer Vision: Part V (EECV '10), pp. 352-365 (2010).
Van De Sande et al., "Segmentation as Selective Search for Object Recognition", Proceedings of the 2011 International Conference on Computer Vision (ICCV '11), pp. 1879-1886 (2011).
Wang et al., "Optimized Color Sampling for Robust Matting", Proceedings of IEEE Computer Vision and Pattern Recognition (CVPR 2007), pp. 1-8 (2007).
Yan et al., "Hierarchical Saliency Detection", Proceedings of IEEE Conference on Computer Vision and Pattern Recognition (CVPR 2013), pp. 1155-1162 (2013).
Adobe Photoshop Help and Tutorials, pp. 222-256 (Sep. 2013).

\* cited by examiner

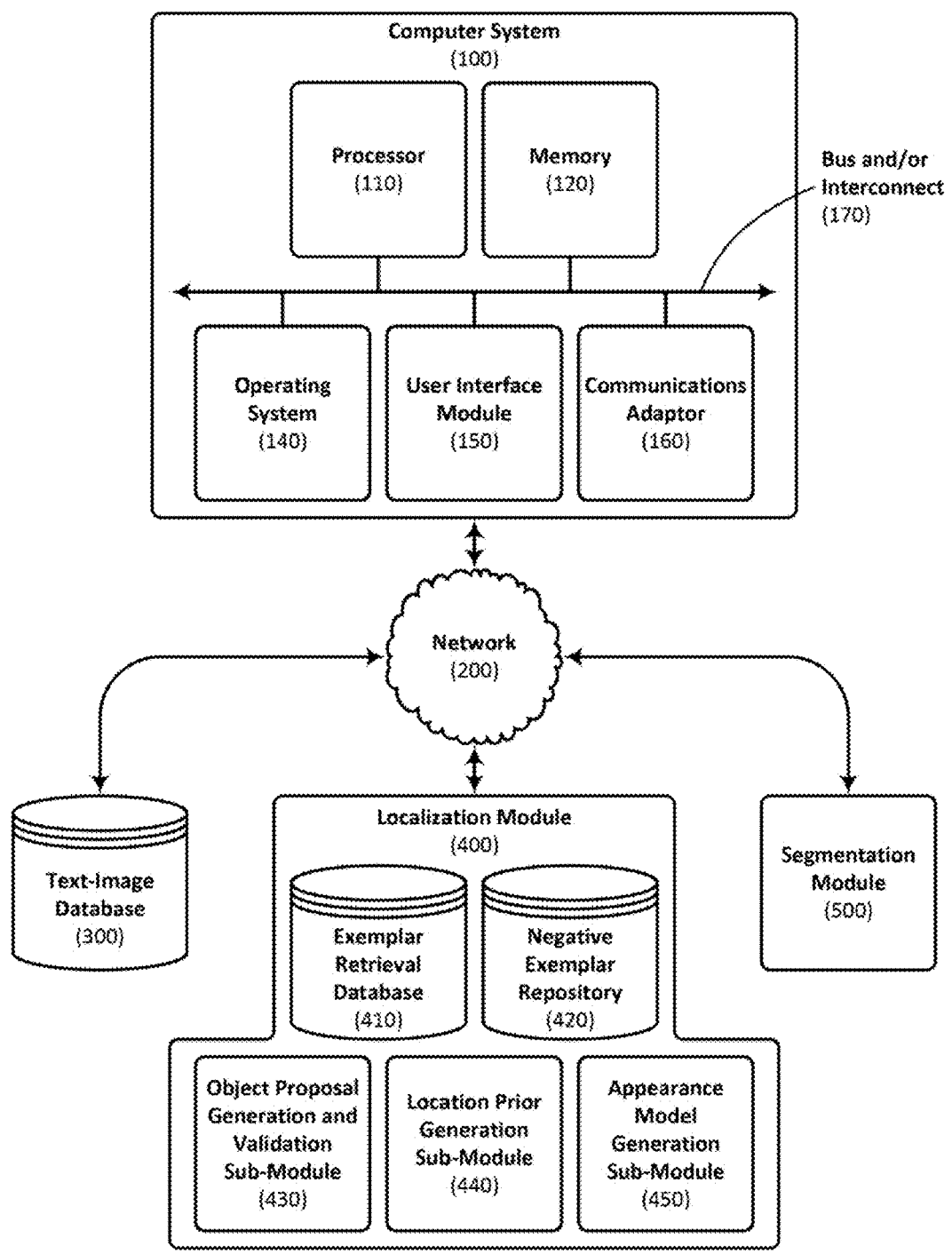

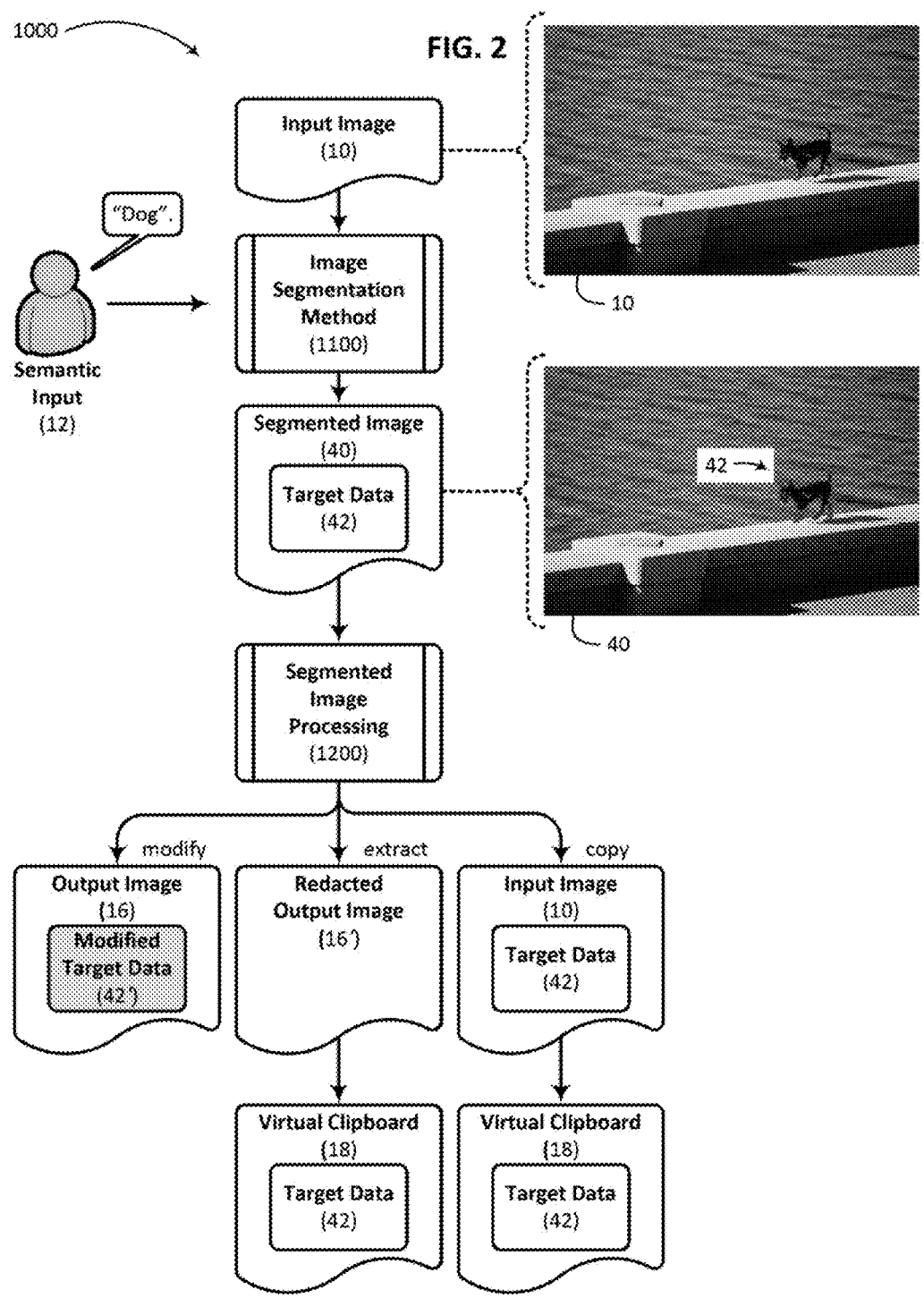

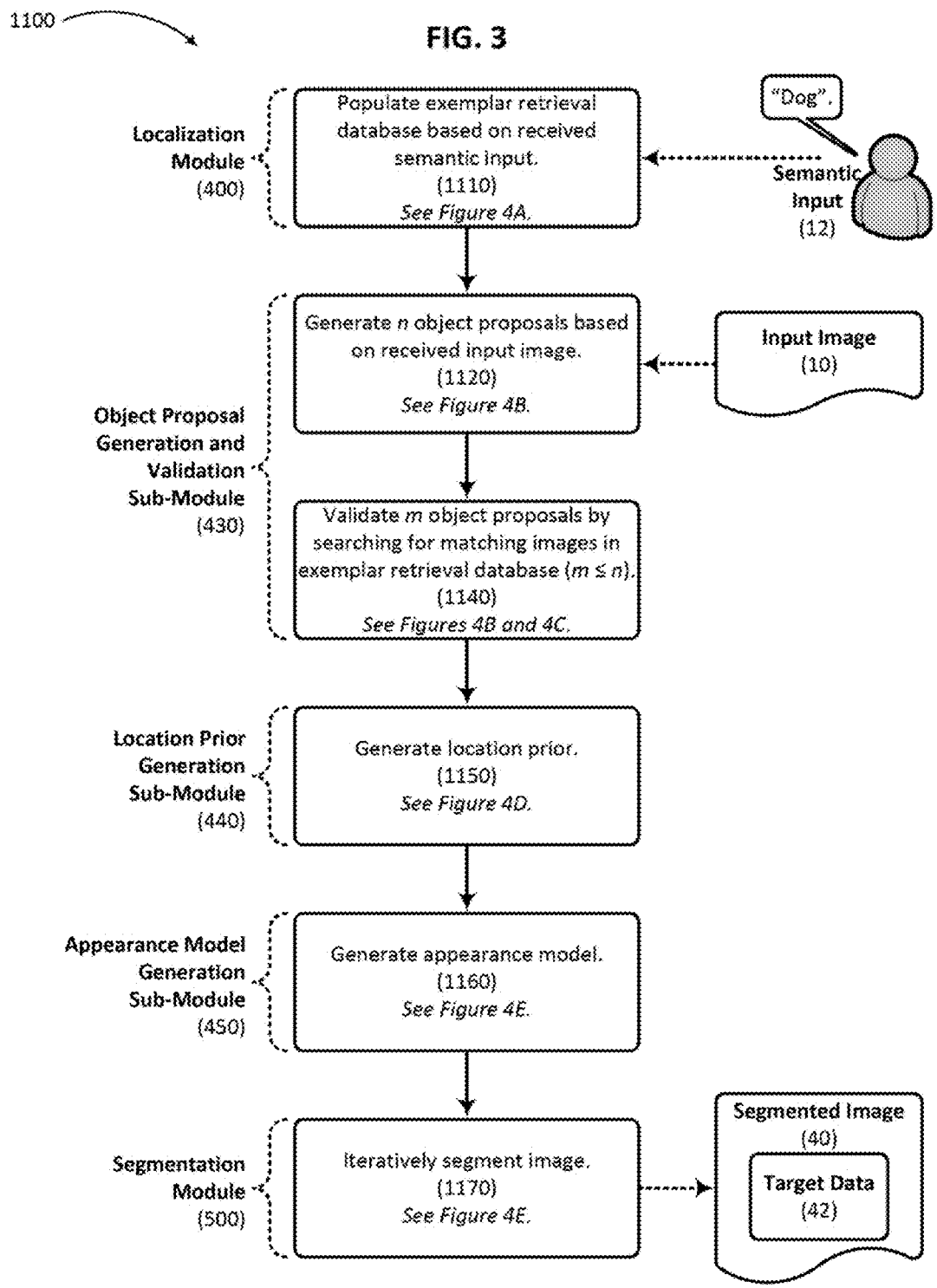

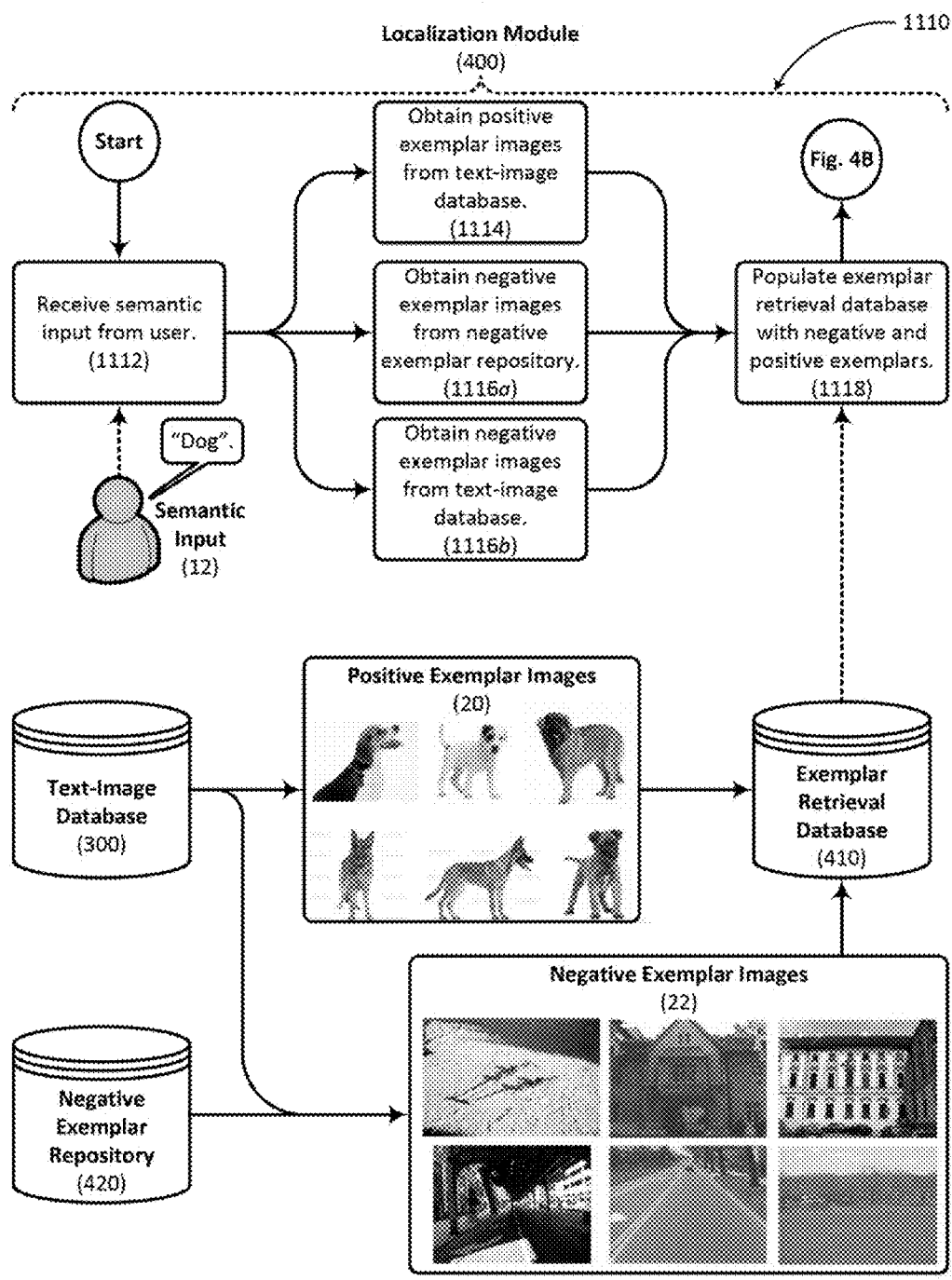

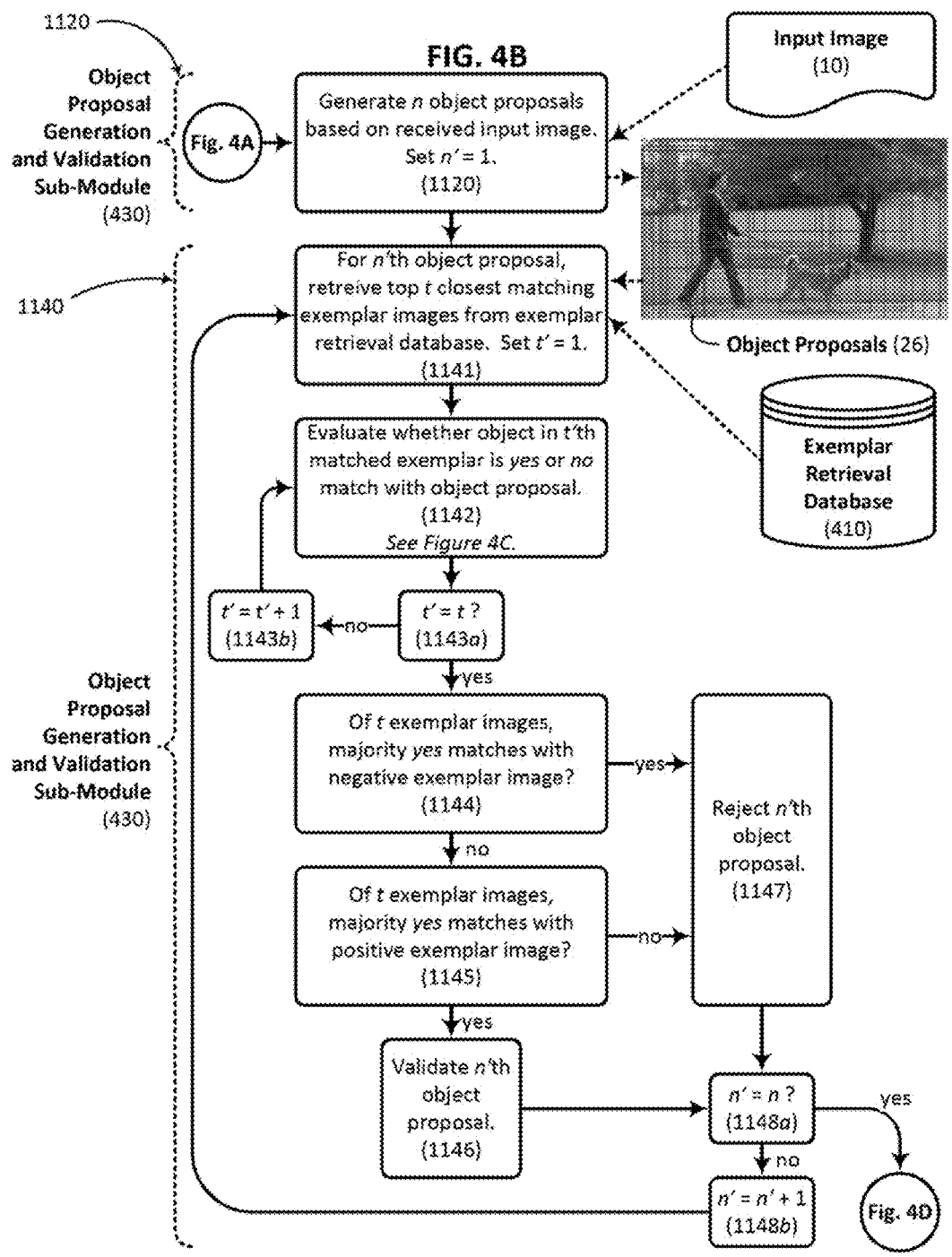

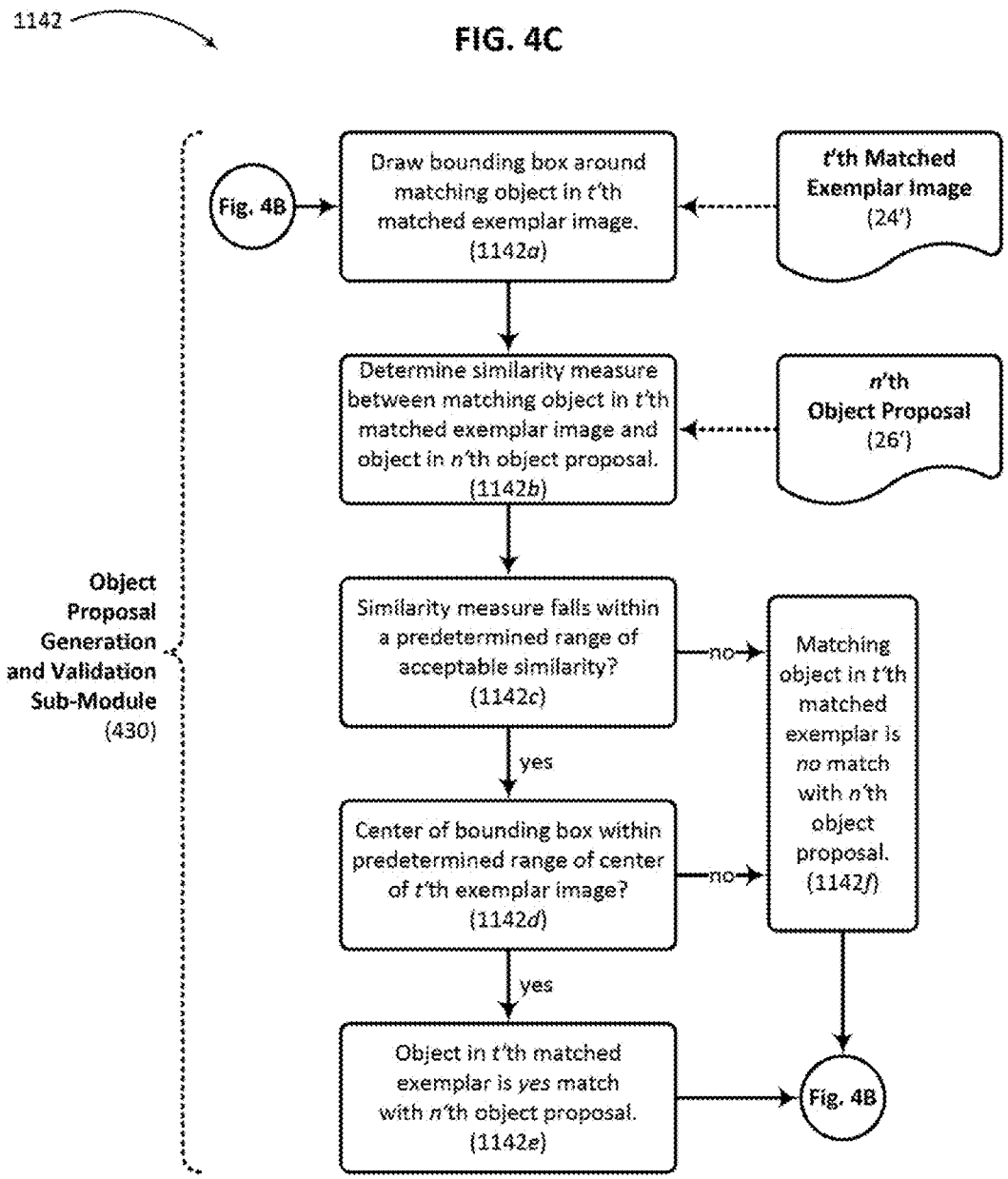

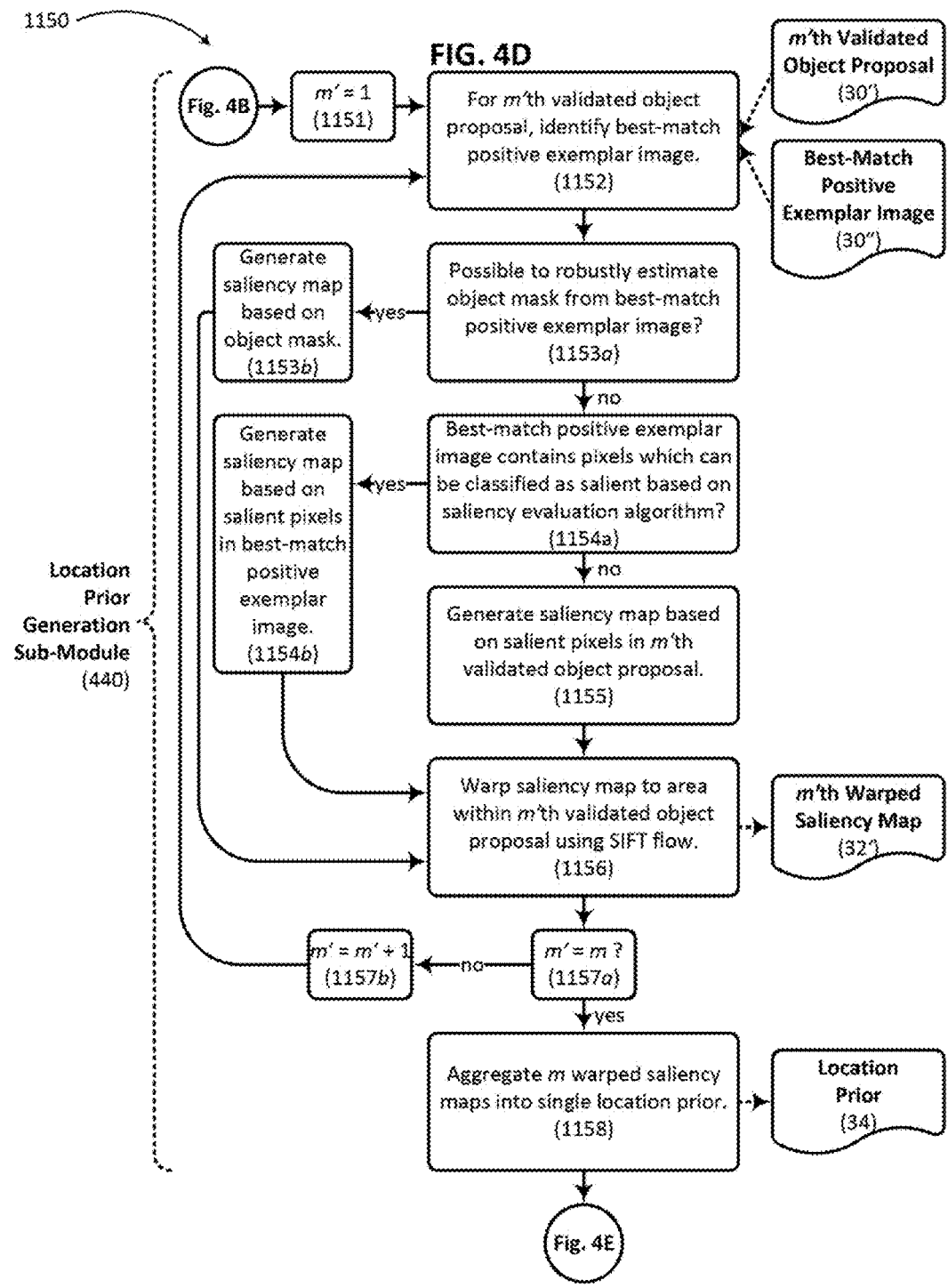

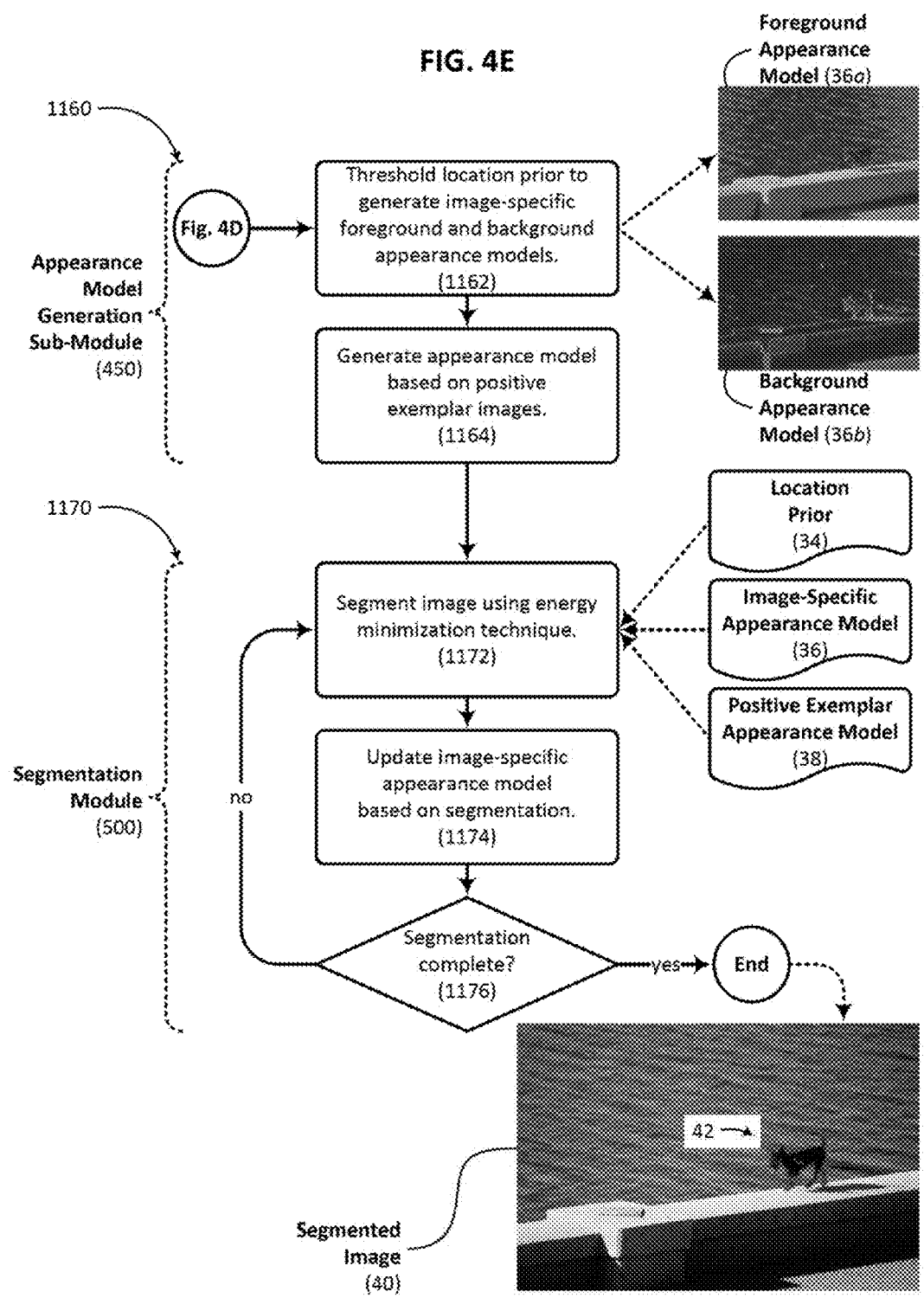

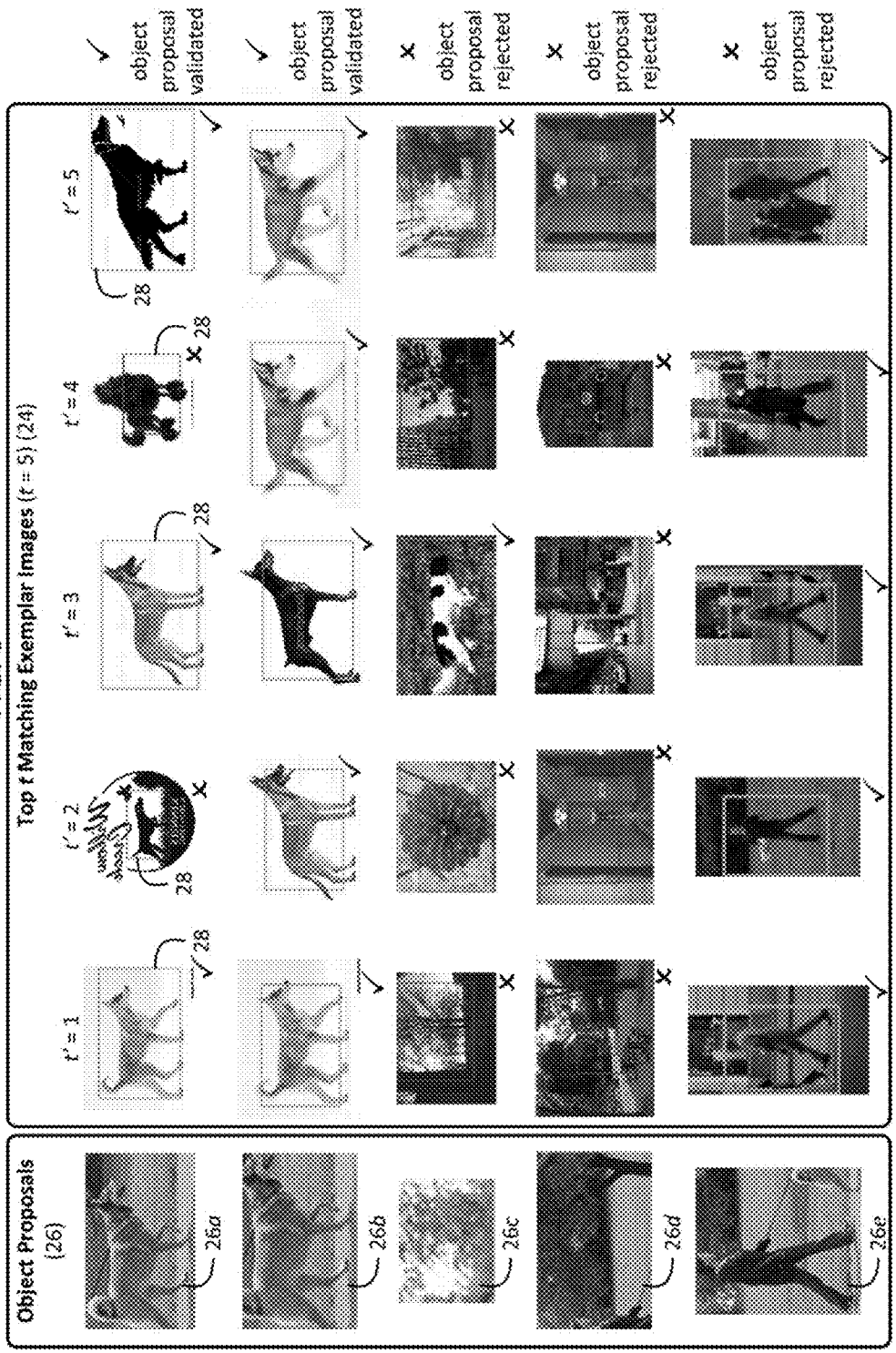

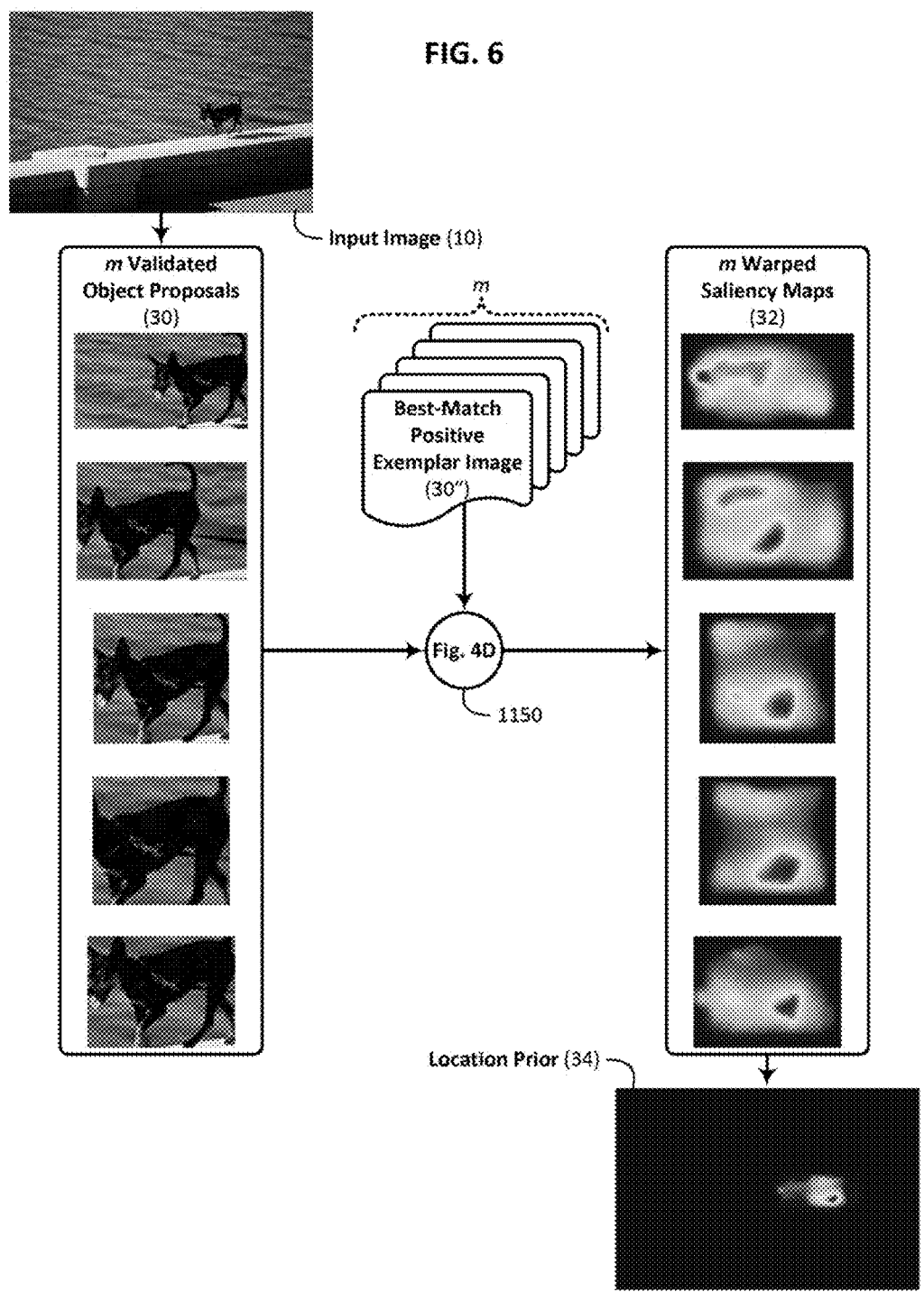

SEMANTIC OBJECT PROPOSAL GENERATION AND VALIDATION

FIELD OF THE INVENTION

This disclosure relates generally to digital image processing, and more specifically to techniques for selecting one or more objects, regions, and/or aspects of a digital image based on semantic input.

BACKGROUND

Image editing software applications have been developed to adjust, modify, and otherwise manipulate digital images. Examples of image editing software applications include Adobe® Photoshop® (Adobe Systems Incorporated, San Jose, Calif.), Corel® Paint Shop Pro® (Corel Corporation, Ottawa, Canada), and Autodesk® SketchBook® (Autodesk, Inc., San Rafael, Calif.). Applications such as these generally allow a user to make global manipulations to an entire image as well as localized manipulations that affect only a selected portion of an image. The ability to make localized manipulations can be useful if a user wishes to, for example, adjust the brightness of a person's face, change the color hue of a flower, or extract foreground objects from a background scene. Regardless of the particular type of image processing which is to be performed, making localized manipulations generally comprises a two-step process of first selecting a portion of the image that is to be manipulated and then applying the desired manipulation to that selection. The initial process of selecting the portion of the image that is to be manipulated is sometimes referred to as "segmentation" of the image.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1 is a block diagram schematically illustrating an example computer system and selected networked computer resources that can be used to provide functionality associated with certain embodiments of the present invention.

FIG. 2 is a flowchart illustrating an example technique for manipulating digital image data based on semantic input, as configured according to certain embodiments of the present invention.

FIG. 3 is a flowchart illustrating an example technique for segmenting a digital image based on semantic input, as configured according to certain embodiments of the present invention.

FIG. 4A is a flowchart illustrating an example technique for populating an exemplar retrieval database with negative and positive exemplars that are selected based on semantic input, as configured according to certain embodiments of the present invention.

FIG. 4B is a flowchart illustrating an example technique for generating and validating object proposals identified in a digital image, as configured according to certain embodiments of the present invention.

FIG. 4C is a flowchart illustrating an example technique for evaluating a t'th matching exemplar image as being either a positive or negative match with a corresponding n'th object proposal, as configured according to certain embodiments of the present invention.

FIG. 4D is a flowchart illustrating an example technique for generating a location prior based on validated object proposals identified in a digital image, as configured according to certain embodiments of the present invention.

FIG. 4E is a flowchart illustrating an example technique for segmenting an image based on a location prior, one or more appearance models, and a smoothness parameter, as configured according to certain embodiments of the present invention.

FIG. 5 is a block diagram schematically illustrating an example technique for validating or rejecting object proposals based on matching exemplar images extracted from an exemplar retrieval database, as configured according to certain embodiments of the present invention.

FIG. 6 is a block diagram schematically illustrating an example technique for generating a location prior based on validated object proposals identified in a digital image, as configured according to certain embodiments of the present invention.

DETAILED DESCRIPTION

Examples of existing interactive image segmentation techniques include the Photoshop "Quick Select", "Magnetic Lasso", and "Magic Wand" tools. Each of these tools require varying degrees of user interaction with an original, unsegmented image, such as by making interior/exterior brush strokes (in the case of the Quick Select tool, which is also sometimes referred to as a "Graph Cut" technique), roughly tracing around a boundary (in the case of the Magnetic Lasso tool, which is also sometimes referred to as an "Intelligent Scissors" tool), or clicking on given interior/exterior points (in the case of the Magic Wand tool). These tools then determine whether or not each image pixel falls within some adjustable tolerance of the color and/or texture characteristics of the targeted region. On the other hand, segmentation techniques that are partially automated or that use streamlined user interaction processes may be easier to use, but often have a difficult time reliably detecting boundaries within an image. As a result, such techniques tend to be more likely to inaccurately include unwanted portions of the image within the selected region or exclude targeted portions of the image from the selected region. An example of an existing partially automated image segmentation technique is "GrabCut", which only requires a user to draw a rough bounding box around the object to be selected; boundary or contrast information is then used to estimate an optimal boundary between foreground and background regions. GrabCut produces satisfactory results when the boundaries of the segmented region are well-defined. All such interactive segmentation techniques tend to have difficulty with highly textured areas and therefore suffer from an inherent tradeoff between ease of use and accuracy of segmentation. In addition, existing fully automated image segmentation techniques lack responsiveness to user input.

Thus, and in accordance with certain embodiments of the present invention, techniques are disclosed herein that enable digital images to be segmented based on a user's semantic input. In other words, given an input image of a person walking a dog adjacent to a tree, a user can simply provide the semantic input "dog" and the system will segment the dog from the other elements in the image. If the user provides other semantic input, such as "person" or "tree", the system will instead segment the person or the tree, respectively, from the same image. Using semantic input advantageously eliminates any need for a user to directly interact with the input image through a tedious process of painting brush strokes, tracing boundaries, clicking target points, and/or drawing bounding boxes. Thus semantic input represents an easier and more intuitive way for users to interact with an image segmentation interface, thereby enabling novice users to take advantage of advanced image segmentation techniques. Furthermore, unlike many of the existing automated image segmentation techniques, certain of the embodiments disclosed herein still retain a valuable degree of user responsiveness by analyzing the semantic input provided by the user. This eliminates many of the problems associated with saliency-based systems that rely on cues such as a single prominently-displayed object located in a central region of an image. The methodologies disclosed herein can be used without (a) large quantities of preprocessed training or exemplar images with predefined object masks or (b) identification of a target object in multiple different target images. As will be further appreciated, the methodologies disclosed herein can be used to segment object classes that have large appearance variations and/or that are not rigidly defined or otherwise configured for use in association with image segmentation applications. Thus certain embodiments of the present invention provide both ease of use and accuracy of segmentation.

For instance, one embodiment of the present invention is configured to receive an image and semantic input identifying one or more objects, regions and/or aspects of the received image which are to be segmented from the remainder of the image. The received image is referred to herein as the "input image", while the area which is to be segmented from the input image is referred to herein as the "target object", or more generally, the "target region" or the "target data". The received semantic input is used to query a text-image database to gather positive exemplar images corresponding to the target data. Negative exemplar images that represent objects which are not to be selected can be gathered as well. For example, the semantic query "person" might yield positive exemplars containing images of people and negative exemplars containing images of background scenes, trees, skyscrapers, giraffes or other objects which may be confused with a person. The negative exemplars can also be collected from a text-image database, and/or may be drawn from a negative exemplar repository containing, for example, generalized background scenes which do not contain prominent objects likely to be the subject of a semantic query. The positive and negative exemplars are gathered into an exemplar retrieval database.

In such embodiments the input image is divided into a number of "object proposals". An object proposal is a region of the input image that is likely to contain a single recognizable object. Object proposals provide reasonable estimates of where the target data may be located within the input image, thereby helping the system to avoid selecting background clutter and enabling the system to more robustly segment general photos of the real world. The exemplar retrieval database is then queried for exemplars which correspond to the various object proposals. Object proposals which sufficiently correspond to positive exemplars in the exemplar retrieval database can be validated as potential matches to the semantic input. Object proposals which sufficiently correspond to negative exemplars in the exemplar retrieval database, or which do not correspond to any exemplars, can be rejected as being unlikely to match the semantic input. This image search methodology based on matching positive and negative exemplars enables individual object proposals to be classified as likely to contain or unlikely to contain an object corresponding to the semantic input. In particular, filtering object proposals using positive and negative exemplars helps avoid selection of background clutter, thus providing a significant improvement with respect to conventional selection algorithms when applied to generalized photos that are not specifically designed for image segmentation applications.

When an object proposal is validated as potentially matching the semantic input, the location of the object in a closely matching exemplar corresponding to the object proposal is estimated. This estimated location information can then be transferred onto the corresponding object proposal using a scale invariant feature transform (SIFT) flow technique to generate a "location prior", in accordance with an embodiment. Use of a SIFT flow technique advantageously compensates for non-rigid and large differences between the appearance of a positive exemplar and a target object to segmented from the input image. The resulting location prior represents a probability field that provides an estimation of the location of the target region within the input image. By applying a threshold to the location prior, foreground and background appearance models corresponding to the target region and the unselected region of the input image can be obtained. These image-specific foreground and background appearance models, the location prior, and an optional secondary appearance model based on positive exemplar images can be provided to an iterative graph cut energy minimization framework to segment the input image. This framework may also include a smoothness parameter intended to penalize selections in which a boundary occurs in the absence of a strong image edge. Such a smoothness parameter can also be used to reduce the occurrence of small isolated areas of selected or unselected pixels ("islands" or "holes", respectively). This localization methodology based on deriving a location prior from validated object proposals enables the energy minimization framework to produce a more accurate segmentation of the input image.

As used herein, the term "semantic input" refers, in addition to its ordinary meaning, to language-based input that identifies one or more objects, regions, and/or other aspects of an input image which are to be segmented. Examples of semantic input include "dog", "person" and "tree". Semantic input may consist of more than one word, and may include additional language-based information intended to more specifically identify the target data. Thus other examples of semantic input include "dog on white background", "person wearing wedding dress" or "tree with yellow leaves". Semantic input can be provided in a variety of different ways, including by typing text-based queries into a user interface using a real or virtual keyboard, providing spoken input to a computer system capable of receiving and understanding voice commands, making a selection from a list of available choices, or typing words using a virtual keyboard and a pointing device such as a finger. Semantic input should be distinguished from graphical input in which a user directly interacts with an input image by, for example, painting brush strokes over the image, tracing boundaries along edges appearing in the image, and/or clicking on points inside or outside a target region.

As used herein, the terms "segmentation", "segmenting", and its derivatives refer, in addition to their ordinary meaning, to the process of selecting or otherwise defining a subset of a digital image that forms a "segment" of the overall image. The result of a segmentation process may involve generating a boundary, a demarcation, a list of pixels, an outline, an image fragment, a highlighted region, or any other appropriate data used to distinguish the portions of the image which have been selected (also referred to as the target data and/or the target region) from the portions of the image which have not been selected. For example, in certain embodiments segmenting an image may result in copying a portion of the image to a clipboard or other cache from which further operations can be performed. In other embodiments segmenting an image may result in drawing a border around a portion of the image which is the target of the segmentation. The segmented portions of the image may or may not be contiguous, and may include incorporated "holes" which remain unselected and/or disconnected "islands" which are selected despite such disconnection.

System Architecture

FIG. 1 is a block diagram schematically illustrating an example computer system and selected networked computer resources that can be used to provide functionality associated with certain embodiments of the present invention. More specifically, FIG. 1 illustrates a computer system 100 configured to leverage certain networked resources in a way that enables target data to be segmented from an input image based on semantic input. Examples of such networked resources include, but are not limited to, a text-image database 300, a localization module 400, and a segmentation module 500. It will be appreciated that in some cases one or more of the illustrated networked resources, or some portion thereof, may instead be integrated into and provided by computer system 100. For example, in one alternative embodiment functionality associated with segmentation module 500 may be provided by computer system 100. Thus other embodiments may have fewer or more networked resources depending on the granularity of implementation. It will therefore be appreciated that the present invention is not intended to be limited to provision or exclusion of any particular resources.

Computer system 100 can be configured to communicate with the various external resources disclosed herein via a network 200, although network 200 can also be used to access other services and/or resources not illustrated in FIG. 1 or otherwise described herein. In such embodiments network 200 may comprise a local area network (such as a home-based or office network), a wide area network (such as the Internet or a public switched telephone network), or a combination of such networks, whether public, private, or both. In general, regardless of the specific nature of network 200, communications amongst the various entities, resources, and services described herein may occur via wired and/or wireless connections, such as may be provided by Wi-Fi or mobile data networks. In some cases access to resources on a given network or computing system may require credentials such as usernames, passwords, and/or compliance with any other suitable security mechanism.

By leveraging the various resources illustrated in FIG. 1, computer system 100 can be configured to segment target data from an input image based on semantic input. To this end, computer system 100 may comprise one or more devices selected form a desktop computer, a laptop computer, a workstation, a tablet computer, a smartphone, a set-top box, or any other such computing device. In other embodiments computer system 100 may comprise a combination of different devices. As illustrated in the example embodiment of FIG. 1, computer system 100 includes hardware and/or software configured to enable the various functionalities disclosed herein. Such hardware may include, among other things, a processor 110, a memory 120, an operating system 140, a user interface module 150, and a communications adaptor 160. A bus and/or interconnect 170 is also provided to facilitate inter- and intra-device communications using, for example, communications adaptor 160. Other componentry and functionality not reflected in the schematic block diagram of FIG. 1 will be apparent in light of this disclosure, and it will be appreciated that the claimed invention is not intended to be limited to any particular hardware and/or software configuration.

Processor 110 may be any suitable processor, and may include one or more coprocessors or controllers, such as an audio processor or a graphics processing unit, to assist in control and processing operations associated with computer system 100. Memory 120 can be implemented using any suitable type of digital storage, such as one or more of a disk drive, a universal serial bus (USB) drive, flash memory, and/or random access memory. Operating system 140 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with computer system 100, and therefore may also be implemented using any suitable existing or subsequently-developed platform. Communications adaptor 160 can be any appropriate network chip or chipset which allows for wired and/or wireless connection to network 200 such that computer system 100 can communicate with other local and/or remote computing systems, servers and/or resources.

User interface module 150 is configured to provide information to, and to receive information and commands form, a user. It can be implemented with or otherwise used in conjunction with a variety of suitable input/output devices such as a display, a touchscreen, a speaker, a keyboard, a mouse, and/or a microphone. User interface module 150 may be installed local to computer system 100, as illustrated in the example embodiment of FIG. 1. Alternatively, computer system 100 may be implemented in a client-server arrangement wherein at least some functionality associated with user interface module 150 is provided to client computer system 100 using a remotely-operating applet, such as a JavaScript applet. In other embodiments such functionality may be provided to client computer system 100 via a downloadable module that can be provisioned in real-time in response to a request from client computer system 100 for access to a given server having resources that are of interest to the user of computer system 100. One example of such a server is a cloud-based repository of images and/or other content to be manipulated by the user. The server, if applicable, may be local to network 200 or remotely coupled to network 200 by one or more other networks and/or communication channels. In any such standalone or networked computing scenarios, user interface module 150 may be implemented using any suitable technologies that allow a user to interact with computer system 100.

In certain embodiments user interface 150 is provided by an image editing software application, thereby enabling such an application to provide the various image segmentation methodologies disclosed herein. As will be appreciated, the image editing software application may be local to computer system 100 or served to computer system 100 by an application server. User interface 150 allows the user of such an application to select a target region of a digital image based on semantic input, as disclosed herein. As illustrated in FIG. 1, this functionality can be implemented by accessing resources such as text-image database 300, and by invoking functionality provided by, for example, localization module 400, and/or segmentation module 500. Text-image database 300 may comprise any suitable database capable of producing images corresponding to a semantic query. Examples of publicly-available text-image databases include Google Image Search (Google Inc., Mountain View, Calif.) and Bing Image Search (Microsoft Corp., Redmond, Wash.). Segmentation module 500 can be configured to use any of a variety of suitable existing or subsequently-developed techniques to segment a digital image given one or more appearance models. For instance, in one embodiment segmentation module 500 uses an iterative graph cut energy minimization framework to segment an input image based on a given probability model. One example of such a framework is described in Rother, et al., "GrabCut: Interactive Foreground Extraction using Iterated Graph Cuts", ACM Trans. Graph., vol. 23, iss. 3, pp. 309-314 (August 2004).

Still referring to the example embodiment illustrated in FIG. 1, localization module 400 can be configured to locate a specific region within a given input image that is likely to contain the targeted data based on received semantic input. Functionality provided by localization module 400 can be leveraged by, for example, an image editing software application executed by computer system 100. This functionality can be implemented using, for example, storage resources such as an exemplar retrieval database 410 and a negative exemplar repository 420. Such functionality can also be implemented using sub-modules including an object proposal generation and validation sub-module 430, a location prior generation sub-module 440, and an appearance model generation sub-module 450. Other resources and/or sub-modules may additionally or alternatively be included in other embodiments. The various resources a sub-modules comprising localization module 400 will be described in greater detail with reference to the example embodiment illustrated in FIG. 3.

The various embodiments disclosed herein can be implemented in various forms of hardware, software, firmware, and/or special purpose processors. For example, in one embodiment a non-transitory computer readable medium has instructions encoded thereon that, when executed by one or more processors, cause one or more of the image segmentation methodologies disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications and/or applets that are tangibly embodied on a memory device, and that can be executed by a computer having any suitable architecture. In one embodiment, the system can be hosted on a given website and implemented using JavaScript or another suitable browser-based technology, for example.

The functionalities disclosed herein can optionally be incorporated into other software applications, such as image editing software applications, word processing applications, desktop publishing applications, or presentation applications. For example, a word processing application can be configured to manipulate digital images that are to be incorporated into a word processing document, and can therefore be configured to implement certain of the functionalities disclosed herein to facilitate such image manipulation. The computer software applications disclosed herein may include a number of different modules, sub-modules, or other components of distinct functionality, and can provide information to, or receive information from, still other components and/or services. These modules can be used, for example, to communicate with input and/or output devices such as a display screen, a touch sensitive surface, a printer, and/or any other suitable input/output device. Other components and functionality not reflected in the illustrations will be apparent in light of this disclosure, and it will be appreciated that the claimed invention is not intended to be limited to any particular hardware or software configuration. Thus in other embodiments the components illustrated in FIG. 1 may comprise additional, fewer, or alternative subcomponents.

The aforementioned non-transitory computer-readable medium may be any suitable medium for storing digital information, such as a hard drive, a server, a flash memory, and/or random access memory. In alternative embodiments, the computer and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that the present invention is not intended to be limited to any particular system architecture.

Methodology: General Overview

FIG. 2 is a flowchart illustrating an example technique for manipulating digital image data based on semantic input, as configured according to certain embodiments of the present invention. In particular, FIG. 2 illustrates an image manipulation method 1000 that comprises a number of sub-processes, including an image segmentation method 1100 that is configured to receive an input image 10 and a semantic input 12. As illustrated, in one example input image 10 comprises a digital image that includes a dog, while semantic input 12 comprises the word "dog". Semantic input 12 may be provided as textual input by typing the word "dog" into a user interface, may be provided as audio input by saying the word "dog" into a microphone, or may be provided using any other suitable input technique. Based on such input, image segmentation method 1100 is configured to generate a segmented image 40 that includes target data 42. In the aforementioned photograph of the dog, target data 42 may roughly comprise that portion of the image which forms the dog. Segmented image processing 1200 can then be performed with respect to segmented image 40, and more specifically with respect to target data 42.

In one embodiment segmented image processing 1200 results in the generation of output image 16, in which the specific effects of segmented image processing 1200 are localized to modified target data 42'. Such specific effects may include, but are not limited to, a brightness adjustment, a contrast adjustment, and/or a color hue adjustment of the aforementioned example dog. In other embodiments, segmented image processing 1200 results in generation of a redacted output image 16' from which target data 42 has been extracted to a virtual clipboard 18, where it can be further processed, modified, or distributed. In still other embodiments, segmented image processing 1200 leaves input image 10 unaffected, but still copies target data 42 to virtual clipboard 18. It will be appreciated that the various effects of segmented image processing 1200 disclosed herein can also be combined with each other, for example such that both target data 42 and modified target data 42' can be extracted to virtual clipboard 18. Additional details of image segmentation method 1100 will be provided in conjunction with FIG. 3.

FIG. 3 is a flowchart illustrating an example technique for segmenting a digital image based on semantic input, as configured according to certain embodiments of the present invention. As can be seen, image segmentation method 1100 includes a number of phases and sub-processes, the sequence of which may vary from one embodiment to another. However, when considered in the aggregate, these phases and sub-processes form a complete image segmentation process that is responsive to user commands in accordance with certain of the embodiments disclosed herein. These methodologies can be implemented, for example, using the system architecture illustrated in FIG. 1 and described herein. However other system architectures can be used in other embodiments, as will be apparent in light of this disclosure. To this end, the correlation of the various functionalities shown in FIG. 3 to the specific components illustrated in FIG. 1 is not intended to imply any structural and/or use limitations. Rather, other embodiments may include varying degrees of integration where multiple functionalities are performed by one system or by separate systems. For example, in an alternative embodiment separate sub-modules can be used to provide object proposal generation and validation services. Thus other embodiments may have fewer or more modules and/or sub-modules depending on the granularity of implementation. Numerous variations and alternative configurations will be apparent in light of this disclosure.

Still referring to FIG. 3, in one embodiment image segmentation method 1100 commences with populating exemplar retrieval database 410 based on received semantic input 12 (see reference numeral 1110 in FIG. 3). This process, which can be performed by localization module 400, is described in greater detail herein in conjunction with FIG. 4A. Alternatively, image segmentation method 1100 may instead commence with the generation of n object proposals based on received input image 10 (see reference numeral 1120 in FIG. 3). This process, which can be performed by object proposal generation and validation sub-module 430, is described in greater detail herein in conjunction with FIG. 4B. In still other embodiments exemplar retrieval database 410 can be populated simultaneously with generation of the object proposals. Thus it will be appreciated that the present invention is not intended to be limited to any particular sequence of these operations.

Once exemplar retrieval database 410 has been populated and the object proposals have been generated, m of the n object proposals can be validated by searching for matching images in exemplar retrieval database 410 (m≤n) (see reference numeral 1140 in FIG. 3). This process, which can also be performed by object proposal generation and validation sub-module 430, is described in greater detail herein in conjunction with FIGS. 4B, 4C, and 5. Based on the validated object proposals and a "best-match" positive exemplar image associated with each validated object proposal, a location prior can then be generated (see reference numeral 1150 in FIG. 3). This process, which can be performed by location prior generation sub-module 440, is described in greater detail herein in conjunction with FIGS. 4D and 6. The best-match positive exemplar images can also form the basis for generating an appearance model for target data 42 (see reference numeral 1160 in FIG. 3). This process, which can be performed by appearance model generation sub-module 450, is described in greater detail herein in conjunction with FIG. 4E. While FIG. 3 illustrates the location prior as being generated before the appearance model, in other embodiments the appearance model may be generated before or concurrently with generation of the location prior. Thus it will be appreciated that the present invention is not intended to be limited to any particular sequence of these operations. The location prior and one or more appearance models can then be used as inputs to a graph cut energy minimization framework to iteratively segment input image 10 to define target data 42 (see reference numeral 1170 in FIG. 3). This process, which can be performed by segmentation module 500, is described in greater detail herein in conjunction with FIG. 4E.

Methodology: Populating an Exemplar Retrieval Database

FIG. 4A is a flowchart illustrating an example technique for populating an exemplar retrieval database with negative and positive exemplars that are selected based on semantic input, as configured according to certain embodiments of the present invention. In particular, FIG. 4A illustrates a method 1110 for using localization module 400 to populate exemplar retrieval database 410 based on received semantic input 12. Aggregating positive and negative exemplar images provides a generalized understanding of the appearance characteristics of the object to be segmented from input image 10. Such appearance characteristics may include, for example, object shape, texture, and/or color. This collection of exemplar images can later be used, for example, to validate object proposals that are identified in input image 10. The exemplar images can also be used to generate appearance models which are provided as an input to the energy minimization image segmentation framework. In general, gathering a larger quantity of exemplar images will provide a wider knowledge base from which the appearance of the object to be segmented can be derived and will allow more accurate object proposals to be validated. However, depending on the processing resources that are available, gathering too many exemplar images may increase segmentation processing time.

Method 1110 commences with receiving the aforementioned semantic input 12 from a user (see reference numeral 1112 in FIG. 4A). This can be accomplished in conjunction with user interface 150, which can be configured to receive semantic input 12 as textual input (for example, via a user typing the word "dog" into a query interface), as audio input (for example, via a user speaking the word "dog" into a microphone coupled to a voice recognition system), or via any other suitable input technique. Regardless of how semantic input 12 is received, such input can form the basis for obtaining positive exemplar images 20 from text-image database 300 (see reference numeral 1114 in FIG. 4A). In such embodiments, text-image database 300 comprises any suitable database capable of generating example images corresponding to a semantic query. Thus, for example, a query for "dog" will generate a large number of example images of dogs. Examples of publicly-available networked text-image databases include the aforementioned Google Image Search and Bing Image Search. In certain embodiments more useful positive exemplar images 20 can be obtained by appending a background neutralizing phrase configured to reduce background clutter, such as the phrase "on white background" to semantic input 12 before querying text-image database 300. Appending this phrase to the search query tends to reduce the likelihood that distracting objects other than the query target object appear in the retrieved exemplar image. FIG. 4A illustrates six positive exemplar images 20 corresponding to semantic input 12 of "dog". It will be appreciated that, in general, a large number of positive exemplar images 20 may be retrieved from text-image database 300.

In addition to obtaining positive exemplar images 20, it is also useful to obtain negative exemplar images 22 corresponding to semantic input 12. Negative exemplar images 22 represent objects which are understood as not being the target of the image segmentation based on semantic input 12. In certain embodiments negative exemplar images 22 can be obtained from negative exemplar repository 420 (see reference numeral 1116a in FIG. 4A). In such embodiments negative exemplar repository 420 may contain generalized background scenes which do not contain prominent objects likely to be the subject of a semantic query. Negative exemplar images 22 may additionally or alternatively be obtained from text-image database 300 (see reference numeral 1116b in FIG. 4A). More specifically, localization module 400 can be configured to query text-image database 300 using terms that are understood to be frequently confused with the terms obtained via semantic input 12. For example, semantic input 12 of "dog" may result in a query for negative exemplar images 22 based on search terms such as "cat", "horse", "buffalo", "zebra", and/or "table", since all of these objects have shapes that might be confused with the shape of a dog. Thus the query for negative exemplar images may be derived from semantic input 12.

Taken together, methods 1116a and 1116b can be understood as gathering negative exemplar images 22 of objects which are not the target of the segmentation of input image 10. For example, semantic input 12 of "person" might, through either or both of such methods, yield negative exemplar images 22 of background scenes, trees, skyscrapers, or other objects which may be confused with a person. While gathering of negative exemplar images 22 has been found to increase the accuracy of the resulting image segmentation, it will be appreciated that in certain embodiments the collection of negative exemplar images 22 may be omitted. FIG. 4A illustrates six negative exemplar images 22 corresponding to semantic input 12 of "dog". It will be appreciated that, in general, a large number of negative exemplar images 20 may be retrieved from text-image database 300 and/or negative exemplar repository 420.

Once positive exemplar images 20, and optionally negative exemplar images 22, have been obtained, exemplar retrieval database 410 can be populated with such exemplars (see reference numeral 1118 in FIG. 4A). Each image in exemplar retrieval database 410 can be tagged as a positive exemplar or as a negative exemplar. As illustrated in FIG. 1, in certain embodiments exemplar retrieval database 410 can be hosted on a remote server providing services associated with localization module 400, although in other embodiments exemplar retrieval database 410 can instead be hosted locally at computer system 100 or elsewhere. Exemplar retrieval database 410 can be configured to store exemplar images associated with a particular image segmentation, and can be cleared, deleted or otherwise purged after such segmentation is complete. Thus in certain embodiments exemplar retrieval database 410 is cleared before being populated with the obtained positive and negative exemplar images 20, 22, thereby ensuring that a particular segmentation is not adversely affected by exemplars used in a prior segmentation.

Positive exemplar images 20 and negative exemplar images 22 gathered in exemplar retrieval database 410 can be leveraged to define appearance characteristics of the object to be segmented from input image 10. This collection of exemplar images can be used to validate object proposals that are identified in input image 10. In particular, because object proposals correspond to regions of input image 10 that are likely to contain a single recognizable object, an object proposal that contains an object that closely resembles an object in a positive exemplar image can be inferred to likely contain some portion of target data 42. Likewise, an object proposal that contains an object that closely resembles an object in a negative exemplar image can be assumed to not correspond to target data 42.

Methodology: Generating and Validating Object Proposals

FIG. 4B is a flowchart illustrating an example technique for generating and validating object proposals identified in a digital image, as configured according to certain embodiments of the present invention. In particular, FIG. 4B illustrates a method 1120 for generating n object proposals 26 based on input image 10, and a method 1140 for validating m object proposals, m≤n. Such methods can be performed using object proposal generation and validation sub-module 430. In general, an object proposal can be understood as a region of the input image, often but not necessarily rectangular, that is likely to contain a single recognizable object. A validated object proposal provides a reasonable estimate of where the target data may be located within the input image, thereby helping the system to avoid selecting background clutter and enabling more robust segmentation of general photos of the real world. To provide a simplistic example, analysis of a rudimentary image of a person walking a dog adjacent to a tree would result in three object proposals: a first rectangular area encompassing the person, a second rectangular area encompassing the dog, and a third rectangular area encompassing the tree. In reality, analysis of such an image would likely result in dozens or more object proposals since object proposal generation algorithms have difficulty distinguishing foreground objects of interest from background clutter. Thus, certain of the embodiments disclosed herein provide a methodology for validating or rejecting object proposals generated from input images.

As illustrated in FIG. 4B, method 1120 comprises generating n object proposals 26 based on received input image 10 (see reference numeral 1120 in FIG. 4B). Object proposal counting parameter n' can be set such that n'=1. One example of a method for generating object proposals is described in van de Sande, et al., "Segmentation as Selective Search for Object Recognition", Proceedings of the 2011 International Conference on Computer Vision (ICCV '11), pp. 1879-1886 (2011). As illustrated in FIG. 4B, the generated object proposals 26 may contain the dog that is the target of the segmentation, but may also contain, in general, a large number of other objects which are not of interest. For example, FIG. 5 illustrates first and second object proposals 26a, 26b that contain the dog, but a third object proposal 26c that contains the tree, a fourth object proposal 26d that contains both the person and the tree, and a fifth object proposal 26e that contains the person and a portion of the dog. It is thus desired to determine which of object proposals 26 possibly contain the target of the segmentation. This process is referred to herein as "validating" certain object proposals 26.

Still referring to FIGS. 4B and 5, method 1140 for validating object proposals commences with retrieving top t matching exemplar images 24 from exemplar retrieval database 410 for n'th object proposal 26' (see reference numeral 1141 in FIG. 4B). Matching exemplar image counting parameter t' can be set such that t'=1. Top t matching exemplar images 24 for n'th object proposal 26' can be identified by calculating a spatially-constrained similarity measure between n'th object proposal 26' and each of the exemplar images stored in exemplar retrieval database 410. The t exemplar images with the highest such similarity measures correspond to top t matching exemplar images 24. The similarity measure used in this regard localizes a given query image (n'th object proposal 26') within database images (the exemplar images stored in exemplar retrieval database 410), and evaluates the similarity between the given object proposal and an object localized in a given exemplar image. This evaluation can be made independent of object rotation, translation, and scaling, thus allowing object retrieval and localization to be performed simultaneously. One example method for calculating such a similarity measure is described in Shen et al., "Object Retrieval and Localization with Spatially-Constrained Similarity Measure and k-NN Re-Ranking", Proceedings of IEEE Computer Vision and Pattern Recognition (CVPR 2012), pp. 3013-3020 (2012).

Calculation of such a spatially-constrained similarity measure for each of the exemplar images enables determination of top t matching exemplar images 24 for n'th object proposal 26'. For example, FIG. 5 illustrates the top five matching exemplar images (t=5) for each of object proposals 26a, 26b, 26c, 26d, 26e. It will be appreciated that while the top five matching exemplar images are illustrated in FIG. 5, in other embodiments any appropriate quantity t of top matching exemplar images can be identified and retrieved from exemplar retrieval database 410. Thus in such embodiments t may equal, for example, one, two, three, four, six, seven, eight, nine, ten, or more top matching exemplar images. In certain embodiments an odd value of t exemplar images is selected such that a subsequent voting methodology does not result in a tie vote.

Once top t matching exemplar images 24 for n'th object proposal 26' are identified, t'th matched exemplar image 24' can be evaluated as either a positive ("yes") or negative ("no") match with the corresponding n'th object proposal 26' (see reference numeral 1142 in FIG. 4B). FIG. 4C is a flowchart illustrating an example technique for evaluating the t'th matched exemplar image as being either a yes or a no match with a corresponding n'th object proposal, as configured according to certain embodiments of the present invention. This evaluation process may be performed using object proposal generation and validation sub-module 430. Method 1142 commences with drawing a bounding box 28 around the matching object in t'th matched exemplar image 24' (see reference numeral 1142a in FIG. 4C). FIG. 5 illustrates that each of top t matching exemplar images 24 has bounding box 28 drawn around the matching object therein.

A spatially-constrained similarity measure between the matching object in t'th matched exemplar image 24' and the corresponding object in n'th object proposal 26' can also be determined (see reference numeral 1142b in FIG. 4C). In certain embodiments the similarity measure used in this regard may be the same as that used in conjunction with method 1141, as disclosed herein. Thus in such embodiments the similarity measure need not be recalculated, but may simply be retrieved from a designated memory location. It will be appreciated that in alternative embodiments the similarity measure can be determined before or simultaneously with drawing of bounding box 28. In any case, once the spatially-constrained similarity measure is determined, it can be established whether the similarity measure falls within a predetermined range of acceptable similarity (see reference numeral 1142c in FIG. 4C). While reference is made herein to a determination with respect to whether a similarity measure falls within a range of acceptable similarity, it will be appreciated that, in general, such a determination can be understood as depending on whether the similarity measure falls within a predetermined range of values that are indicative of an acceptable degree of similarity.

Still referring to FIG. 4C, if the similarity measure does not fall within the predetermined range of acceptable similarity, the matching object in t'th matched exemplar image 24' is determined to be a no match with the corresponding n'th object proposal 26' (see reference numeral 1142f in FIG. 4C). On the other hand, if the similarity measure does fall within the predetermined range of acceptable similarity, it can then be determined whether the center of bounding box 28 is within a predetermined range of the center of t'th matched exemplar image 24' (see reference numeral 1142d in FIG. 4C). If the center of bounding box 28 is outside the predetermined range of the center of t'th matched exemplar image 24', the matching object in t'th matched exemplar image 24' is determined to be a no match with the corresponding n'th object proposal 26' (see reference numeral 1142f in FIG. 4C). On the other hand, if the similarity measure falls within the predetermined range of acceptable similarity, and if the center of bounding box 28 is within the predetermined range of the center of t'th matched exemplar image 24', the matching object in t'th matched exemplar image 24 can be determined to be a yes match with the corresponding n'th object proposal 26 (see reference numeral 1142e in FIG. 4C).

FIG. 5 illustrates an example methodology for determining whether each of top t matching exemplar images 24 is a yes or no match with a corresponding object proposal 26. Each of object proposals 26a, 26b, 26c, 26d, 26e is illustrated adjacent to the corresponding top five matching exemplar images. In the case of first object proposal 26a, the first, third and fifth matching exemplar images (t'=1, 3, 5) are each considered to be yes matches with first object proposal 26a because (a) they each have a similarity measure that falls within a predetermined range of acceptable similarity, and (b) in each case the center of bounding box 28 is within the predetermined range of the center of the exemplar image. On the other hand, the second matching exemplar image (t'=2) is considered to be a no match with first object proposal 26a because even though the center of bounding box 28 is within the predetermined range of the center of the exemplar image, the similarity measure does not fall within the predetermined range of acceptable similarity. Likewise, the fourth matching exemplar image (t'=4) is considered to be a no match with first object proposal 26a because even though the similarity measure falls within the predetermined range of acceptable similarity, the center of bounding box 28a is outside the predetermined range of the center of the exemplar image.

Still referring to FIG. 5, in the case of second object proposal 26b, all five of the matching exemplar images are considered to be yes matches. In the case of third object proposal 26c, only the third matching exemplar image (t'=3) is considered to be a yes match; all of the other exemplar images have an insufficient similarity measure and/or have a non-centered bounding box. In the case of fourth object proposal 26d, all five of the matching exemplar images are considered to be no matches. In the case of fifth object proposal 26e, all five of the matching exemplar images are considered to be yes matches. Thus it can be seen that the various object proposals 26 are compared with the corresponding top t matching exemplar images 24 retrieved from exemplar retrieval database 410 in method 1141 illustrated in FIG. 4B.

Referring again to FIG. 4B, once t'th matched exemplar image 24' is evaluated as a yes or no match with respect to n'th object proposal 26', it can be determined whether all t top matching exemplar images 24 have been so evaluated. That is, it can be determined whether t'=t (see reference numeral 1143a in FIG. 4B). If not, the matching exemplar image counting parameter t' can be incremented such that t'=t'+1 (see reference numeral 1143b in FIG. 4B), and the process of evaluating t'th matched exemplar image 24' can be repeated as illustrated in FIG. 4C. On the other hand, if all of top t matching exemplar images 24 have been evaluated as yes or no matches with respect to n'th object proposal 26', a voting methodology can be used to determine whether n'th object proposal 26' should be validated or rejected. An example of such a voting methodology is illustrated in FIG. 4B.

Specifically, once all of top t matching exemplar images 24 are evaluated as yes or no matches with respect to n'th object proposal 26', it can be determined whether a majority of the top t matching exemplar images 24 are yes matches with a negative exemplar image (see reference numeral 1144 in FIG. 4B). If this is the case, n'th object proposal 26' is rejected (see reference numeral 1147 in FIG. 4B). For example, in the case of fifth object proposal 26e illustrated in FIG. 5, all five exemplar images are yes matches with negative exemplar images. In particular, because fifth object proposal 26e contained an image of a person, this object proposal generated matches with images of people in exemplar retrieval database 410. Any images of people in exemplar retrieval database 410 will be tagged as negative exemplars because semantic query 12 was "dog". Because all five exemplar images associated with fifth object proposal 26e are yes matches with a negative exemplar image, fifth object proposal 26e can be rejected, as illustrated in FIG. 5.

If a majority of the top t matching exemplar images 24 are not yes matches with a negative exemplar image, it can be determined whether a majority of the top t matching exemplar images 24 are yes matches with a positive exemplar image (see reference numeral 1145 in FIG. 4B). If this is the case, n'th object proposal 26' is validated (see reference numeral 1146 in FIG. 4B). For example, in the case of first object proposal 26a illustrated in FIG. 5, the first, third and fifth matching exemplar images (t'=1, 3, 5) are each considered to be yes matches with positive exemplar image. In particular, because first object proposal 26a contained an image of a dog, this object proposal generated matches with images of dogs in exemplar retrieval database 410. Any images of dogs in exemplar retrieval database 410 will be tagged as positive exemplars because semantic query 12 was "dog". Because three of the five exemplar images associated with first object proposal 26a are yes matches with a positive exemplar image, first object proposal 26a can be validated, as illustrated in FIG. 5. As another example, in the case of second object proposal 26b illustrated in FIG. 5, all five exemplar images are yes matches with a positive exemplar image, and therefore second object proposal 26b can be validated as well.

If a majority of the top t matching exemplar images 24 are not yes matches with either a positive or a negative exemplar image, n'th object proposal 26' is rejected (see reference numeral 1147 in FIG. 4B). For example, in the case of third object proposal 26c illustrated in FIG. 5, only the third matching exemplar image (t'=3) is considered to be a yes match with an exemplar image (regardless of whether positive or negative). All of the other matching exemplar images were determined to be no matches because (a) each has a similarity measure that does not fall within the predetermined range of acceptable similarity, and/or (b) each has a bounding box center that is outside the predetermined range of the center of the corresponding exemplar image. Thus third object proposal 26c is rejected, notwithstanding the fact that one positive exemplar image (t'=3) was found to correlate to the object proposal. Likewise, in the case of fourth object proposal 26d illustrated in FIG. 5, all of the matching exemplar images were also determined to be no matches, thus resulting in rejection of fourth object proposal 26d. While a majority voting scheme is described here with respect to one embodiment, it will be appreciated that it other embodiments other voting schemes based on more or less than 50% of yes votes may be implemented.

Referring again to FIG. 4B, once n'th object proposal 26' is validated or rejected, it can be determined whether all n object proposals 26 have been similarly evaluated. That is, it can be determined whether n'=n (see reference numeral 1148a in FIG. 4B). If not, the object proposal counting parameter n' can be incremented such that n'=n'+1 (see reference numeral 1148b in FIG. 4B), and the process of evaluating n'th object proposal 26' can be repeated as illustrated in FIG. 4B. On the other hand, if all n object proposals 26 are either rejected or validated, the resulting m validated object proposals (m≤n) can be used to generate a location prior, as will be described in turn.

Thus FIGS. 4B and 4C collectively illustrate an example methodology for generating and validating object proposals 26 based on a received input image 10 and based on positive and negative exemplar images 20, 22 stored in exemplar retrieval database 410. FIG. 5 illustrates an example technique for voting on whether top t matching exemplar images 24 correspond to a given object proposal 26. Validated object proposals provide a reasonable estimate of where target data 42 may be located within input image 10. In particular, a set of m validated object proposals can be used to generate a location prior which represents a probability field that estimates the location of target data 42 within an object proposal 26, and therefore within input image 10 as a whole. Thus the set of m validated object proposals serves as a groundwork for localizing target data 42 within input image 10.

Methodology: Generating a Location Prior

FIG. 4D is a flowchart illustrating an example technique for generating a location prior based on validated object proposals identified in a digital image, as configured according to certain embodiments of the present invention. FIG. 6 is a block diagram schematically illustrating an example technique for generating a location prior based on validated object proposals identified in a digital image, as configured according to certain embodiments of the present invention. Thus FIGS. 4D and 6 collectively illustrate a method 1150 for generating a location prior 34 based on a set of m validated object proposals 30 and a corresponding set of m best-match positive exemplar images 30". Method 1150 can be performed using location prior generation sub-module 440. The resulting location prior 34 represents a probability field that estimates the location of target data 42 within input image 10. By applying a threshold to location prior 34, foreground and background appearance models corresponding to the target region and the unselected region of input image 10 can be obtained. These foreground and background appearance models can form the basis of a subsequent segmentation based on the probabilities contained within location prior 34.

As illustrated in FIG. 4D, method 1150 commences with setting a validated object proposal counting parameter m' such that m'=1 (see reference numeral 1151 in FIG. 4D). For m'th validated object proposal 30', a corresponding best-match positive exemplar image 30" can then be identified (see reference numeral 1152 in FIG. 4D). As used herein, a "best-match" positive exemplar image 30" can be understood as referring to a positive exemplar image including an object with an appearance that most closely matches an object appearing in a corresponding object proposal 26. The characteristic of being "most closely" matching can be quantitatively or qualitatively evaluated using one or more of a variety of suitable similarity measures, and thus the present invention is not intended to be limited to any one particular technique for identifying best-match positive exemplar image 30". In certain embodiments the similarity measure used in this regard may be the same spatially-constrained similarity measure that is used in conjunction with method 1141 performed by object proposal generation and validation sub-module 430, as disclosed herein. In such embodiments the similarity measure need not be recalculated, but instead the matching exemplar image ranked as being the most-closely matching exemplar compared to the corresponding object proposal can also be identified as best-match positive exemplar image 30". This can be accomplished by tagging best-match positive exemplar image 30" in exemplar retrieval database 410 as such. For example, in the embodiment illustrated in FIG. 5, the m' best-match positive exemplar images 30" will correspond to the exemplars in the column t'=1.

Once best-match positive exemplar image 30" is identified, a saliency map can be generated based on such exemplar. A saliency map represents an estimation of the probability that each of the pixels comprising the exemplar is "salient", or is likely to form part of an object that falls within the target region that is to be segmented from input image 10. To this end, it can first be determined whether it is possible to robustly estimate an object mask from best-match positive exemplar image 30" (see reference numeral 1153a in FIG. 4D). In particular, where best-match positive exemplar image 30" comprises a distinct object on a plain white background, or on another background that is clearly distinguishable from the object, it may be possible to robustly estimate an object mask directly from the exemplar itself. Whether such a robust estimate is possible may depend on one or more evaluations, such as an evaluation whether distinguishable object edges can reliably be extracted from best-match positive exemplar 30". If it is possible to robustly estimate an object mask from the exemplar, a saliency map can be generated based on the estimated object mask (see reference numeral 1153b in FIG. 4D). In this case, pixels within the mask have a high (or definite) likelihood of corresponding to an object in the target region to be segmented, while pixels outside the mask have a low (or non-existent) likelihood of corresponding to an object in the target region to be segmented.

If it is impossible to robustly estimate an object mask from best-match positive exemplar image 30", it can then be determined whether best-match positive exemplar image 30" contains pixels which can be classified as salient based on a saliency evaluation algorithm (see reference numeral 1154a in FIG. 4D). In particular, a saliency evaluation algorithm can be used to obtain a soft segmentation mask of best-match positive exemplar image 30" such that each pixel in the exemplar is assigned a probability in the range [0, 1]. A soft segmentation mask generated in this way functions as a saliency map based on salient pixels in best-match positive exemplar image 30" (see reference numeral 1154b in FIG. 4D). Any of a wide variety of appropriate saliency evaluation algorithms can be used to create such a soft segmentation mask; one example of such an algorithm is disclosed in Harel, et al., "Graph-Based Visual Saliency", Advances in Neural Information Processing Systems 19, pp. 545-552 (2007).

In some cases the saliency evaluation algorithm may not be able to generate an accurate, useful or otherwise meaningful soft segmentation mask based on best-match positive exemplar image 30". This may be due to a variety of reasons, such as the presence of multiple objects in the exemplar, the presence of highly textured regions within the exemplar, or other factors which result in the absence of discernable object edges which can be reliably detected. Where this is the case, a saliency map can be generated based on applying the aforementioned saliency evaluation algorithm directly to m'th validated object proposal 30' (see reference numeral 1155 in FIG. 4D). The resulting saliency map can then be mapped to best-match positive exemplar image 30".

Regardless of whether the saliency map is generated using an object mask or a saliency evaluation algorithm, the generated saliency map can then be warped to the area within m'th validated object proposal 30' using a SIFT flow technique (see reference numeral 1156 in FIG. 4D). This results in a m'th warped saliency map 32' that corresponds to m'th validated object proposal 30' In general, by itself a given object proposal 26 identifies only a rectangular window in input image 10 where the target region is estimated to exist. This rough localization can be improved using the saliency map generated using method 1150. In particular, the aforementioned SIFT flow technique allows a saliency map to be warped to the area within a corresponding object proposal 26. The resulting warped saliency map represents a more precise localization estimate of where the target region actually exists within object proposal 26, thereby effectively filtering out a portion of object proposal 26. Any of a wide variety of appropriate SIFT flow techniques can be used to generate a warped saliency map; one example of such a technique is disclosed in Liu, et al., "SIFT Flow: Dense Correspondence Across Different Scenes", Proceedings of the 10th European Conference on Computer Vision: Part III (EECV '08), pp. 28-42 (2008).

Referring still to FIG. 4D, once m'th warped saliency mask 32' is generated, it can be determined whether m warped saliency masks 32 have been generated for all m validated object proposals 30. That is, it can be determined whether m'=m (see reference numeral 1157a in FIG. 4D). If not the validated object proposal counting parameter m' can be incremented such that m'=m'+1 (see reference numeral 1157b in FIG. 4D), and the process of generating m'th warped saliency mask 32' can be repeated as illustrated in FIG. 4D. On the other hand, if m warped saliency masks 32 are generated for all m validated object proposals 30, then the resulting m warped saliency maps 32 can be aggregated into a single location prior 34 (see reference numeral 1158 in FIG. 4D). Because many of m validated object proposals 30 may be shifted versions of the same object, their corresponding saliency masks may overlap each other when applied to input image 10. Thus all m warped saliency masks 32 can be aggregated on input image 10 and the corresponding probabilities for each pixel can be renormalized such that the probability for each pixel comprising the resulting location prior 34 falls in the range [0, 1]. FIG. 6 illustrates that m validated object proposals 30 are mapped onto m warped saliency maps 32 based on corresponding m best-match positive exemplar images 30" using method 1150. The resulting m warped saliency maps 32 are then aggregated into a single location prior 34 that corresponds to input image 10.

The resulting location prior 34 represents a probability field that provides an estimated location of the target region within input image 10. In particular, each pixel of location prior 34 comprises a probability that the corresponding pixel in input image 10 should be included within target data 42. Unlike m validated object proposals 30 which are a rough localization indicating a particular rectangular region of input image 10, location prior 34 is scaled to provide a probability corresponding to each pixel in input image 10. Applying a threshold to location prior 34 enables image-specific foreground and background appearance models corresponding to the target region and the unselected region of input image 10 to be obtained. These image-specific appearance models, location prior 34, and an optional secondary appearance model based on positive exemplar images 20 can be provided to an iterative graph cut energy minimization framework to segment input image 10.

Methodology: Segmenting an Input Image

FIG. 4E is a flowchart illustrating an example technique for segmenting an image based on a location prior, one or more appearance models, and a smoothness parameter, as configured according to certain embodiments of the present invention. In particular, FIG. 4E illustrates an appearance model generation method 1160 which can be performed by appearance model generation sub-module 450, and an image segmentation method 1170 which can be performed by segmentation module 500. In general, image segmentation can be performed using an iterative graph cut energy minimization framework that attempts to minimize an energy parameter corresponding to one or more of a number of model inputs. Example model inputs include the previously generated location prior 34; an image-specific appearance model 36; an optional positive exemplar appearance model 38; and a smoothness parameter configured to reduce the occurrence of islands or holes associated with target data 42. The appearance models provide a statistical model that approximates the appearance of the target region and/or the background region in terms of appearance parameters such as color, texture and shape. It will be appreciated that, in general, not all of the model inputs disclosed herein are required to perform a graph cut energy minimization process. Additional, alternative or fewer inputs may be used in other embodiments. For example, in a modified embodiment the use of positive exemplar appearance model 38 may be omitted as a factor in the energy minimization framework.

As illustrated in FIG. 4E, method 1160 comprises applying a threshold to location prior 34 to generate an image-specific foreground appearance model 36a and an image-specific background appearance model 36b (see reference numeral 1162 in FIG. 4E). Specifically, pixels in location prior 34 that correspond to a probability above a predetermined threshold $\gamma_F$ are assumed to be in the foreground of input image 10. For example, in certain embodiments $\gamma_F$ has a value between 0.5 and 1.0, such as 0.55, 0.60, 0.65, 0.70, 0.75, 0.80, 0.85, 0.90, or 0.95, although other values outside this range can be used in other embodiments. In one particular embodiment $\gamma_F=0.80$. Likewise, pixels in location prior 34 that correspond to a probability below a predetermined threshold $\gamma_B$ are assumed to be in the background of input image 10. For example, in certain embodiments $\gamma_B$ has a value between 0.0 and 0.5, such as 0.01, 0.02, 0.03, 0.04, 0.05, 0.06, 0.07, 0.08, 0.09, 0.10, 0.20, 0.30, or 0.40, although other values outside this range can be used in other embodiments. In one particular embodiment $\gamma_B=0.05$. Based on application of thresholds $\gamma_F$ and $\gamma_B$, separate foreground and background appearance models 36a, 36b can then be defined based on the known colors of the input image pixels assumed to be in the foreground and background, respectively. In other embodiments, appearance parameters in addition to or instead of color can be used to generate the foreground and background appearance models 36a, 36b.

Where color is used as an appearance parameter, foreground appearance model 36a models a foreground color probability $P_F(c_p; x_p)$, that is, the probability that a given pixel p will have color $c_p$ given that p has label $x_p$ corresponding to the image foreground. Likewise, background appearance model 36b models a background color probability $P_B(c_p; x_p)$, that is, the probability that pixel p will have color $c_p$ given that p has label $x_p$ corresponding to the image background. In one embodiment a five-component Gaussian mixture model is used for the foreground and background appearance models 36a, 36b, although other probability models may be used in other embodiments depending on the particular appearance parameters used in a given application. The foreground and background appearance models 36a, 36b can be combined to generate an image-specific appearance model 36 having foreground and background appearances derived from input image 10. While image-specific appearance model 36 is determined using color as the relevant appearance characteristic in this example embodiment, it will be appreciated that in other embodiments additional or alternative appearance characteristics may be incorporated into image-specific appearance model 36, such as object texture and/or shape.

In certain embodiments appearance model generation submodule 450 is also configured to generate an optional positive exemplar appearance model 38 based on one or more positive exemplar images 20 (see reference numeral 1164 in FIG. 4E). Generating an appearance model based on a subset of positive exemplar images 20 stored in exemplar retrieval database 410 is useful in sharing information from exemplars, and is particularly useful when segmenting objects having an appearance that does not change significantly across a given set of exemplars. This would occur, for example, where semantic input 12 provides additional detail regarding the object to be segmented as compared to a more generic query (for instance, "grey German Shepard" as compared to "dog"). In one embodiment the m best-match positive exemplar images 30" form the basis for generating positive exemplar appearance model 38. For example, in certain embodiments the shapes of the dogs appearing in the m best-match positive exemplar images 30" may be used to generate a "shape prior" to encourage the selection of a dog appearing in input image 10 to more closely match the shapes in the m best-match positive exemplar images 30".

Once one or more appearance models have been generated, segmentation module 500 can be used to segment input image 10 using an iterative graph cut energy minimization technique (see reference numeral 1172 in FIG. 4E). This energy minimization technique is based on one or more of appearance models 36 and/or 38 as well as location prior 34. The energy minimization technique may also optionally include a smoothness parameter configured to reduce the occurrence of islands or holes associated with target data 42. Thus, if x is the vector of all pixel labels $x_p$, $\mathcal{A}$ is the set of all appearance models used to characterize target data 42, and $\chi_\epsilon$ is the set of all positive exemplar data used to generate both location prior 34 and positive exemplar appearance model 38, the energy function $E(x; \mathcal{A}, \chi\epsilon)$ represents a Markov Random Field (MRF) energy function for a given segmentation defined by x. This energy function $E(x; \mathcal{A}, \chi\epsilon)$ can be expressed as a linear combination of a unary data term $E_p(x_p; \mathcal{A}, \chi\epsilon)$ representing the energy potential contribution from the appearance models $\mathcal{A}$ for pixel p, and a scaled smoothness parameter $E_{pq}(x_p, x_q)$ representing a pairwise energy potential contribution based on pixel p and neighboring pixel q. That is, $$E(x; \mathcal{A}, \mathcal{X}\varepsilon) = \sum_p E_p(x_p; \mathcal{A}, \mathcal{X}\varepsilon) + \lambda \sum_{p,q} E_{pq}(x_p, x_q). \qquad (1)$$

Minimizing the MRF energy function $E(x; \mathcal{A}, \chi\epsilon)$ for a given set of appearance models $\mathcal{A}$ and set of positive exemplar data $\chi_\epsilon$ will result in the target segmentation of input image 10, thereby resulting in segmented image 42.

The smoothness coefficient $\lambda$ controls the amount of smoothness in the resulting segmentation and represents a tradeoff between smoothness and energy minimization. In particular, small islands or holes in the targeted region can be reduced by increasing $\lambda$. However, increasing $\lambda$ beyond a certain threshold may result in a less accurate image segmentation. Thus in certain embodiments a reduced value of $\lambda$ is selected and a post-processing operation is optionally performed to remove islands smaller than a threshold size (effectively removing such islands from target data 42) and/or remove holes smaller than a threshold size (effectively incorporating such holes into target data 42). In certain embodiments $\lambda$ has a value between 0 and 100, such as 10, 20, 30, 40, 50, 60, 70, 80, or 90, although other values outside this range can be used in other embodiments. In one particular embodiment $\lambda=50$.

In general, unary data term $E_p(x_p; \mathcal{A}, \chi\epsilon)$ can be understood as quantifying the energy cost of labeling pixel p as $x_p$ given appearance models $\mathcal{A}$ and positive exemplar data $\chi_\epsilon$. In particular, unary data term $E_p(x_p; \mathcal{A}, \chi\epsilon)$ is a linear combination of three terms: an energy potential contribution derived from image-specific appearance model 36 ($E_{p,IS}$), an energy potential contribution derived from positive exemplar appearance model 38 ($E_{p,PE}$), and an energy potential contribution derived from location prior 34 ($E_{p,PE}$). Thus $$E_p(x_p; \mathcal{A}, \chi\epsilon) = E_{p,IS} + E_{p,PE} + E_{p,LP}, \quad (2)$$

where $$E_{p,IS} = -\alpha_{IS} \log p(x_p; c_p, A_{IS}), \quad (3)$$

$$E_{p,PE} = -\alpha_{PE} \log p(x_p; c_p, A_{\chi\epsilon}), \text{ and} \quad (4)$$

$$E_{p,LP} = -\alpha_{LP} \log M_p(x_p; \chi\epsilon). \quad (5)$$

Here image-specific appearance model 36 ($A_{IS}$) is based on the color $c_p$ of a given pixel p (as derived from an image-specific probability model), and the positive exemplar appearance model 38 ($A_{PE}$) is likewise based on the color $c_p$ of a given pixel p (as derived from a corresponding positive exemplar probability model). Appearance characteristics in addition to, or instead of, color can be used in other embodiments. Because location prior 34 represents a soft segmentation having probabilistic values in the range [0, 1] it is possible to use $$M_p(x_p; \chi\epsilon) = M_p^{x_p} (1 - M_p)^{1-x_p} \quad (6)$$

as representing location prior 34 ($M_p$) in Equation (5).

The weighting parameters $\alpha_{IS}$, $\alpha_{PE}$, and $\alpha_{LP}$ can be derived using a variety of different techniques, such as by analyzing the results of a one-time manual segmentation of a small set of training images. One example of such a training is disclosed in Kuettel, et al., "Segmentation Propagation in ImageNet", Proceedings of the 12th European Conference on Computer Vision: Part VII (EECV '12), pp. 459-473 (2012). In one embodiment $\alpha_{IS}$=0.6, $\alpha_{PE}$=0.0, and $\alpha_{LP}$=0.40, although in general each of these parameters can fall within the range 0.0≤α≤1.0. Thus any of the weighting parameters a may have α value such as 0.0, 0.1, 0.2, 0.3, 0.4, 0.5, 0.6, 0.7, 0.8, 0.9, or 1.0, although other values may be used in other embodiments. In general, when segmenting objects with a consistent appearance, such as when semantic input 12 is relatively specific (for example, "grey German Shepard"), positive exemplar appearance model 38 tends to be more useful thus suggesting use of a higher weighting parameter $\alpha_{PE}$. On the other hand when segmenting objects with a large variation in appearance, such as when semantic input 12 is more generalized (for example, "dog"), positive exemplar appearance model 38 tends to be less useful thus suggesting use of a lower or zero-value weighting parameter $\alpha_{PE}$. Thus the weighting parameters $\alpha_{IS}$, $\alpha_{PE}$, and $\alpha_{LP}$ can understood as representing the importance of, and confidence in, the location prior and the various appearance models for a given application.

In certain embodiments smoothness parameter $E_{pq}(x_p, x_q)$ can be given by $$E_{pq}(x_p, x_q) = \delta(x_p \neq x_q) \cdot d(p,q)^{-1} \cdot \exp(-\gamma \|c_p - c_q\|^2), \quad (7)$$

Smoothness parameter $E_{pq}(x_p, x_q)$ encourages smoothness by penalizing neighboring pixels taking different labels $x_p$, $x_q$. The magnitude of the penalty depends on the color contrast between pixels $-\gamma\|c_p - c_q\|^2$, the penalty being smaller in high-contrast regions around detected edges within input image 10. This is because the correct selection boundary between, for example, a grey dog and a background field of green grass, is more likely to occur at a strong color edge in input image 10. While a q=8 pixel connected grid surrounding given pixel p is used in certain embodiments, other neighboring regions can be used in other embodiments. Thus $E_{pq}(x_p, x_q)$ is typically set to zero if $x_p = x_q$, and is some decreasing function of the color difference between pixels p and q otherwise. It will be appreciated that appearance parameters in addition to or instead of color, such as shape and/or texture, can be used in evaluating smoothness parameter $E_{pq}(x_p, x_q)$ in other embodiments.

Once input image 10 is segmented using an energy minimization technique such as described herein, image-specific appearance model 36 can be updated based on the results of that segmentation (see reference numeral 1174 in FIG. 4E). In particular, image-specific appearance model 36 can be updated based on foreground and background appearance models derived from the prior graph cut energy minimization iteration. The extent to which image-specific appearance model 36 is modified in this regard can inform a decision with respect to whether the segmentation is complete (see reference numeral 1176 in FIG. 4E). For example, in certain embodiments where the image-specific appearance model 36 changes by less than a predetermined amount $\Delta A_{IS}$, the segmentation process can be considered complete. In other embodiments the image-specific appearance model can be updated a predetermined quantity k times before the segmentation is considered complete. The completed segmentation will result in segmented image 40 having a defined subset of target data 42 corresponding to the original semantic input 12 query.

Results

The accuracy of a segmentation performed using the methodologies disclosed herein can be quantitatively evaluated using a Jaccard similarity coefficient $J_s$. The Jaccard similarity coefficient $J_s$ can be defined by $$J_s = \frac{t_p}{t_p + f_p + f_n}, \quad (8)$$

where $t_p$ is the total number of accurately selected pixels, $f_n$ is the total number of "missed" pixels that should have been selected but were not, and $f_p$ is the total number of pixels in the selected region. To quantitatively test certain of the embodiments disclosed herein, approximately thirty images were selected from each of nine image classes provided in the image database described in Shotton et al., "TextonBoost: Joint Appearance, Shape and Context Modeling for Multi-class Object Recognition and Segmentation", Proceedings of the 9th European Conference on Computer Vision: Part I (EECV '06), pp. 1-15 (2006) ("Shotton"). The aforementioned Google Image Search tool was used to obtain positive exemplar images which were supplemented by additional positive exemplar images extracted from the Pattern Analysis, Statistical Modelling and Computational Learning (PASCAL) Visual Object Classes (VOC) 2010 image database available from http://www.pascal-network.org/challenges-NOC/-voc2010/workshop/index.html. The resulting image set contained images having a salient target object on a relatively uniform background. The location prior threshold γ, weighting parameters a and smoothness coefficient λ were set such that $\gamma_B$=0.05, $\gamma_F$=0.8, $\alpha_{IS}$=0.6, $\alpha_{PE}$=0.0, $\alpha_{LP}$=0.4 and λ=50. The weighting parameter for positive exemplar appearance model $\alpha_{PE}$ was set to zero because the test images to which the segmentation technique was applied contained objects with a relatively large variation in appearance. That is, the image classes were defined in relatively broad semantic terms, such as "bike", "bird", and "car".

The Jaccard similarity coefficient $J_s$ corresponding to segmentation using an example embodiment disclosed herein was compared with a corresponding coefficient resulting from segmentation using four different cosegmentation techniques. Cosegmentation techniques operate on multiple input images and select within each image a common feature among the input image set. Since cosegmentation methodologies operate on a set of input images, all of the approximately thirty test images were supplied to the cosegmentation algorithms evaluated for the purpose of this comparison. The compared cosegmentation algorithms are described in: Joulin et al., "Multi-Class Cosegmentation", Proceedings of IEEE Computer Vision and Pattern Recognition (CVPR 2012), pp. 542-549 (2012) ("Joulin-1"); Joulin et al., "Discriminative Clustering for Image Co-Segmentation", Proceedings of IEEE Computer Vision and Pattern Recognition (CVPR 2010), pp. 1943-1950 (2010) ("Joulin-2"); Kim et al., "Distributed Cosegmentation via Submodular Optimization on Anisotropic Diffusion", Proceedings of the 2011 International Conference on Computer Vision (ICCV '11), pp. 169-176 (2011) ("Kim"); and Mukherjee et al., "Scale Invariant Cosegmentation for Image Groups", Proceedings of IEEE Computer Vision and Pattern Recognition (CVPR 2011), pp. 1881-1888 (2011) ("Mukherjee").

The Jaccard similarity coefficient $J_s$ corresponding to segmentation using an example embodiment disclosed herein was also compared with a corresponding coefficient resulting from segmentation using an alternative cosegmentation technique that optimizes over a function with terms emphasizing sparseness (similarity of pixels between images) and saliency (uniqueness of the pixels in an image). This method is described in Rubinstein et al., "Unsupervised Joint Object Discovery and Segmentation in Internet Images", Proceedings of IEEE Computer Vision and Pattern Recognition (CVPR 2013), pp. 1939-1946 (2013) ("Rubinstein"). Because the Rubinstein method relies heavily on saliency, it generally performs better on images that include highly salient objects that are to be segmented.

The results of the foregoing comparison are listed in Table A. In particular, Table A illustrates that the tested example embodiment provides a segmentation that is significantly more accurate than the compared cosegmentation techniques in most applications. The closest methodology in terms of accuracy of segmentation is provided by Rubinstein. However, the set of test images used to generate the segmentation data provided in Table A contained images having a salient target object on a relatively uniform background. Because the Rubinstein technique relies heavily on saliency, it generally performs better using such methods.

TABLE A

Jaccard similarity coefficient $J_s$ resulting from a comparison of image segmentation techniques using images having a salient target object on a relatively uniform background (Shotton data).

| Image Class | Example Embodiment | Joulin-1 | Joulin-2 | Kim | Mukherjee | Rubinstein |
|---|---|---|---|---|---|---|
| bike | 55.3 | 43.3 | 42.3 | 29.9 | 42.8 | 54.1 |
| bird | 64.6 | 47.7 | 33.2 | 29.9 | — | 67.3 |
| car | 66.8 | 59.7 | 59.0 | 37.1 | 52.5 | 66.7 |
| cat | 70.7 | 31.9 | 37.6 | 28.7 | 39.4 | 66.2 |
| chair | 60.3 | 39.6 | 37.6 | 28.7 | 39.4 | 62.2 |
| cow | 78.5 | 52.7 | 45.0 | 33.5 | 26.1 | 79.4 |
| dog | 69.1 | 41.8 | 41.3 | 33.0 | — | 675 |
| plane | 58.8 | 21.6 | 21.7 | 25.1 | 33.4 | 56.7 |
| sheep | 81.2 | 66.3 | 60.4 | 60.8 | 45.7 | 78.9 |
| average | 67.3 | 45.0 | 42.0 | 34.0 | 39.9 | 66.5 |

Therefore, a more accurate comparison with the Rubinstein technique can be achieved by using a set of test images that has a larger variation in characteristics such as style, color, texture, pose, scale, position, and viewing angle. A second set of test images was gathered from the dataset disclosed in Rubinstein. In particular, approximately one hundred images were selected from each of three image classes provided in the Rubinstein dataset. Positive exemplar images were selected only from the aforementioned PASCAL VOC 2010 image database. The resulting image set contained images having a target object which was not salient in the image, thus corresponding to more realistic images than the special-purpose images obtained from the Shotton database. The results of the foregoing comparison are listed in Table B. In particular, Table B illustrates that the tested example embodiment provides a segmentation that is significantly more accurate than the compared cosegmentation techniques. Notably, when the comparison is based on the more realistic non-salient images obtained from Rubinstein, the marginal advantage of the tested example embodiment as compared to Rubinstein is significantly greater than with respect to the higher saliency example images obtained from Shotton.

TABLE B

Jaccard similarity coefficient $J_s$ resulting from a comparison of image segmentation techniques using images having a non-salient target object (Rubinstein data)

| Image Class | Example Embodiment | Joulin-1 | Joulin-2 | Rubinstein |
|---|---|---|---|---|
| airplane | 64.27 | 11.72 | 15.36 | 55.81 |
| car | 71.84 | 35.15 | 37.15 | 64.42 |
| horse | 55.08 | 39.53 | 30.16 | 51.65 |
| average | 63.73 | 28.80 | 27.56 | 57.29 |

Although the present invention is not intended to be limited to any particular principle of operation, it is believed that the significantly improved results illustrated in Table B are at least partially attributable to the use of a highly accurate location prior as the basis for generating the foreground and background appearance models which are provided to the energy minimization framework.

CONCLUSION

Numerous variations and configurations will be apparent in light of this disclosure. For instance, one example embodiment provides a non-transient computer readable medium having instructions encoded thereon that, when executed by one or more processors, causes an image segmentation process to be carried out. The process comprises receiving semantic input from a user. The semantic input corresponds to target data which is to be segmented from an input image. The process further comprises segmenting the target data from the input image based on the semantic input. Segmentation is performed without requiring the user to provide graphical input with respect to the input image. In some cases segmenting the target data further comprises minimizing an energy potential associated with (a) an image-specific appearance model derived from an appearance characteristic extracted from the input image; and (b) a positive exemplar appearance model derived from one or more positive exemplars retrieved from a text-image database based on the semantic input. In some cases the process further comprises generating a location prior corresponding to the input image, wherein segmenting the target data further comprises minimizing an energy potential associated with the location prior. In some cases the process further comprises (a) validating an object proposal that is derived from the input image, thereby producing a validated object proposal, wherein validating the object proposal is based on a plurality of positive exemplar images retrieved from a text-image database; (b) generating a saliency map for a best-match positive exemplar image corresponding to the validated object proposal; (c) warping the saliency map to an area within the validated object proposal, thereby producing a warped saliency map; and (d) generating a location prior based on the warped saliency map, wherein segmenting the target data further comprises minimizing an energy potential associated with the location prior. In some cases segmenting the target data is performed based on the input image, the semantic input, and a plurality of positive exemplar images that are retrieved from a text-image database based on the semantic input. In some cases the process further comprises (a) generating a revised image-specific appearance model based on the segmentation; and (b) performing a second segmentation of the target data from the input image based on the revised image-specific appearance model.

Another example embodiment of the present invention provides an image segmentation method. The method comprises receiving semantic input from a user. The semantic input corresponds to target data which is to be segmented from an input image. The method further comprises segmenting the target data from the input image based on the semantic input. Segmentation is performed without receiving user input corresponding to an interaction between the user and the input image. In some cases segmenting the target data comprises (a) generating an image-specific appearance model based on a location prior that corresponds to the input image; (b) minimizing an energy potential associated with the image-specific appearance model to produce an initial segmentation; (c) updating the image-specific appearance model based on the initial segmentation; and (d) minimizing an energy potential associated with the updated image-specific appearance model to produce a revised segmentation. In some cases segmenting the target data further comprises minimizing an energy potential associated with a smoothness parameter that depends on a color contrast between adjacent pixels of the input image, wherein the energy potential associated with the smoothness parameter is reduced for pixels adjacent to a detected edge in the input image. In some cases the semantic input is selected from a group consisting of a textual query typed into a user interface and a verbal query spoken into a microphone. In some cases the method further comprises (a) retrieving a plurality of positive exemplar images from a text-image database based on the semantic input; and (b) populating a database with the retrieved positive exemplar images. In some cases the method further comprises (a) retrieving a plurality of negative exemplar images from a source selected from the group consisting of (i) a text-image database based on the semantic input, and (ii) a negative exemplar repository; and (b) populating a database with the retrieved negative exemplar images. In some cases the method further comprises generating a location prior corresponding to the input image, wherein segmenting the target data further comprises minimizing an energy potential associated with the location prior. In some cases the method further comprises (a) generating a location prior corresponding to the input image; and (b) generating an image-specific appearance model based on a color model derived from the location prior, wherein segmenting the target data further comprises minimizing an energy potential associated with the image-specific appearance model.

Another example embodiment of the present invention provides a system comprising an exemplar retrieval database storing a plurality of positive exemplar images that correspond to semantic input received from a user. The system further comprises an object proposal generation module configured to generate a plurality of object proposals based on an input image. The system further comprises an object proposal validation module configured to validate at least one of the plurality of object proposals, thereby resulting in one or more validated object proposals. The system further comprises a location prior generation module configured to generate a location prior based on the one or more validated object proposals. The system further comprises an appearance model generation module configured to generate an appearance model based on the location prior. The system further comprises a segmentation module configured to segment target data from the input image based on minimizing a potential energy associated with the location prior and the appearance model. The target data corresponds to the semantic input. In some cases the appearance model generation module is further configured to generate a positive exemplar appearance model derived from the plurality of positive exemplar images. In some cases the system further comprises a user interface module configured to receive the semantic input from the user in the form of at least one of a textual query and an audio query. In some cases (a) the object proposal validation module is configured to identify a validated object proposal based on matching regions found in multiple positive exemplar images stored in the exemplar retrieval database with a region found in a selected object proposal; and (b) the location prior generation module is configured to generate the location prior by (i) identifying a best-match positive exemplar image stored in the exemplar retrieval database; (ii) generating a saliency map based on the best-match positive exemplar; and (iii) warping the saliency map to an area within the validated object proposal. In some cases the segmentation module is further configured to segment the target data from the input image based on minimizing a potential energy associated with a smoothness parameter that depends on a color contrast between adjacent pixels of the input image, wherein the energy potential associated with the smoothness parameter is reduced for pixels adjacent to a detected edge in the input image. In some cases the object proposal validation module is configured to validate at least one of the plurality of object proposals based on matching objects found in a plurality of positive exemplar images stored in the exemplar retrieval database with an object found in the at least one of the plurality of object proposals.

The foregoing description of the embodiments of the invention has been presented for purposes of illustration and description. It is not intended to be exhaustive or to limit the invention to the precise form described. Many modifications and variations are possible in light of this disclosure. It is intended that the scope of the invention be limited not by this detailed description, but rather by the claims appended hereto.

What is claimed is:
1. An image segmentation method comprising:
receiving semantic input from a user, wherein the semantic input corresponds to target data which is to be segmented from an input image; and
segmenting the target data from the input image based on the semantic input, wherein segmentation is performed without receiving user input corresponding to an interaction between the user and the input image, and wherein segmenting the target data further comprises
generating an image-specific appearance model based on a location prior that corresponds to the input image,
minimizing an energy potential associated with the image-specific appearance model to produce an initial segmentation, updating the image-specific appearance model based on the initial segmentation, and
minimizing an energy potential associated with the updated image-specific appearance model to produce a revised segmentation.

2. The method of claim 1, wherein segmenting the target data further comprises minimizing an energy potential associated with a smoothness parameter that depends on a color contrast between adjacent pixels of the input image, wherein the energy potential associated with the smoothness parameter is reduced for pixels adjacent to a detected edge in the input image.

3. The method of claim 1, wherein the semantic input is selected from a group consisting of a textual query typed into a user interface and a verbal query spoken into a microphone.

4. The method of claim 1, further comprising:
retrieving a plurality of positive exemplar images from a text-image database based on the semantic input; and
populating a database with the retrieved positive exemplar images.

5. The method of claim 1, further comprising:
retrieving a plurality of negative exemplar images from a source selected from a group consisting of (a) a text-image database based on the semantic input, and (b) a negative exemplar repository; and
populating a database with the retrieved negative exemplar images.

6. The method of claim 1, further comprising generating the location prior corresponding to the input image.

7. The method of claim 1, further comprising:
generating an image-specific appearance model based on a color model derived from the location prior, wherein segmenting the target data further comprises minimizing an energy potential associated with the image-specific appearance model based on the color model.

8. A non-transient computer readable medium having instructions encoded thereon that, when executed by one or more processors, causes an image segmentation process to be carried out, the process comprising:
receiving semantic input from a user, wherein the semantic input corresponds to target data which is to be segmented from an input image; and
segmenting the target data from the input image based on the semantic input, wherein segmentation is performed without requiring the user to provide graphical input with respect to the input image, and wherein segmenting the target data further comprises
generating an image-specific appearance model based on a location prior that corresponds to the input image,
minimizing an energy potential associated with the image-specific appearance model to produce an initial segmentation,
updating the image-specific appearance model based on the initial segmentation, and
minimizing an energy potential associated with the updated image-specific appearance model to produce a revised segmentation.

9. The non-transient computer readable medium of claim 8, wherein segmenting the target data further comprises minimizing an energy potential associated with:
a positive exemplar appearance model derived from one or more positive exemplars retrieved from a text-image database based on the semantic input.

10. The non-transient computer readable medium of claim 8, wherein the process further comprises generating the location prior corresponding to the input image.

11. The non-transient computer readable medium of claim 8, wherein the process further comprises:
validating an object proposal that is derived from the input image, thereby producing a validated object proposal, wherein validating the object proposal is based on a plurality of positive exemplar images retrieved from a text-image database;
generating a saliency map for a best-match positive exemplar image corresponding to the validated object proposal;
warping the saliency map to an area within the validated object proposal, thereby producing a warped saliency map; and
generating the location prior based on the warped saliency map.

12. The non-transient computer readable medium of claim 8, wherein segmenting the target data is performed based on the input image, the semantic input, and a plurality of positive exemplar images that are retrieved from a text-image database based on the semantic input.

13. The non-transient computer readable medium of claim 8, wherein the process further comprises:
generating a revised image-specific appearance model based on the initial segmentation; and
performing a second segmentation of the target data from the input image based on the revised image-specific appearance model.

14. A system comprising:
an exemplar retrieval database storing a plurality of positive exemplar images that correspond to semantic input received from a user;
an object proposal generation module configured to generate a plurality of object proposals based on an input image;
an object proposal validation module configured to validate at least one of the plurality of object proposals, thereby resulting in one or more validated object proposals;
a location prior generation module configured to generate a location prior based on the one or more validated object proposals;
an appearance model generation module configured to generate an appearance model based on the location prior; and
a segmentation module configured to segment target data from the input image based on minimizing a potential energy associated with the location prior and the appearance model, wherein the target data corresponds to the semantic input.

15. The system of claim 14, wherein the appearance model generation module is further configured to generate a positive exemplar appearance model derived from the plurality of positive exemplar images.

16. The system of claim 14, further comprising a user interface module configured to receive the semantic input from the user in the form of at least one of a textual query and an audio query.

17. The system of claim 14, wherein:
the object proposal validation module is configured to identify a validated object proposal based on matching regions found in multiple positive exemplar images stored in the exemplar retrieval database with a region found in a selected object proposal; and
the location prior generation module is configured to generate the location prior by:
identifying a best-match positive exemplar image stored in the exemplar retrieval database;

generating a saliency map based on the best-match positive exemplar; and warping the saliency map to an area within the validated object proposal.

18. The system of claim 14, wherein the segmentation module is further configured to segment the target data from the input image based on minimizing a potential energy associated with a smoothness parameter that depends on a color contrast between adjacent pixels of the input image, wherein the energy potential associated with the smoothness parameter is reduced for pixels adjacent to a detected edge in the input image.

19. The system of claim 14, wherein the object proposal validation module is configured to validate at least one of the plurality of object proposals based on matching objects found in a plurality of positive exemplar images stored in the exemplar retrieval database with an object found in the at least one of the plurality of object proposals.

* * * * *